(12) United States Patent
Matsumoto

(10) Patent No.: US 7,248,750 B2
(45) Date of Patent: Jul. 24, 2007

(54) OBJECT INFORMATION PROCESSING APPARATUS, IMAGE PROCESSING SYSTEM, GAME APPARATUS AND IMAGE PROCESSING METHOD

(75) Inventor: Kazuyoshi Matsumoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 368 days.

(21) Appl. No.: 10/727,609

(22) Filed: Dec. 5, 2003

(65) Prior Publication Data

US 2004/0113917 A1 Jun. 17, 2004

(30) Foreign Application Priority Data

Dec. 13, 2002 (JP) .............................. 2002-363151

(51) Int. Cl.
*G06K 9/40* (2006.01)
(52) U.S. Cl. .................... 382/275; 382/264; 345/589
(58) Field of Classification Search ................ 345/624, 345/600, 620, 589, 591
See application file for complete search history.

(56) References Cited

U.S. PATENT DOCUMENTS

| | | | | |
|---|---|---|---|---|
| 4,841,289 A * | 6/1989 | Kambayashi et al. | ....... | 345/589 |
| 5,235,650 A * | 8/1993 | Jeong | .......... | 382/158 |
| 5,249,264 A * | 9/1993 | Matsumoto | ................. | 345/624 |
| 5,909,219 A * | 6/1999 | Dye | .............. | 345/582 |
| 6,144,374 A * | 11/2000 | Hyun | ........................ | 345/204 |
| 6,263,088 B1 | 7/2001 | Crabtree et al. | | |
| 6,380,946 B1 * | 4/2002 | Galal | ........................ | 345/620 |
| 6,417,861 B1 * | 7/2002 | Deering et al. | ............. | 345/589 |
| 6,693,643 B1 * | 2/2004 | Trivedi et al. | .............. | 345/602 |
| 6,728,406 B1 * | 4/2004 | Murao | ........................ | 382/191 |
| 6,781,590 B2 * | 8/2004 | Katsura et al. | ............. | 345/538 |
| 6,828,982 B2 * | 12/2004 | Lee | ............. | 345/604 |
| 6,967,660 B2 * | 11/2005 | Sasaki | ........................ | 345/519 |
| 6,967,664 B1 * | 11/2005 | Taylor et al. | ............... | 345/620 |
| 7,064,793 B2 * | 6/2006 | Hahn et al. | ................. | 348/619 |

(Continued)

FOREIGN PATENT DOCUMENTS

JP 59-132075 7/1984

(Continued)

OTHER PUBLICATIONS

Andreadis, I., et al., "Image Pixel Classification By Chromaticity Analysis", Pattern Recognition Letters, North-Holland Publication, Amsterdam, NL, vol. 11, No. 1, Jan. 1990, pp. 51-58, XP 000084831.

(Continued)

*Primary Examiner*—Mark Zimmerman
*Assistant Examiner*—Kevin Xu
(74) *Attorney, Agent, or Firm*—Harness, Dickey & Pierce, PLC

(57) ABSTRACT

An object information processing apparatus is provided for obtaining object information from input image data comprising pixels. The object information processing apparatus comprises an object determination section for determining whether or not each pixel is a part of an object to be extracted by comparing color information indicating a color of the pixel with a predetermined reference value for the object, and an object information retaining section for retaining coordinate data of the pixel as the object information if the pixel has been determined by the object determination section to be a part of the object to be extracted.

21 Claims, 18 Drawing Sheets

U.S. PATENT DOCUMENTS

2001/0046309 A1* 11/2001 Kamei .................. 382/103
2002/0136449 A1* 9/2002 Park et al. ............. 382/164
2003/0063093 A1* 4/2003 Howard et al. ......... 345/581

FOREIGN PATENT DOCUMENTS

JP          63-088684      4/1988
JP          06-266841      9/1994

OTHER PUBLICATIONS

Hsieh, I-S., et al., "A Statistic Approach to the Detection of Human Faces in Color Nature Scene", Pattern Recognition Letters, Elsevier, Kidlington, GB, vol. 35, No. 7, Jul. 2002, pp. 1583-1596, XP004345155.

Vandenbroucke, N., et al., "Contribution of a Color Classification to Soccer Players Tracking with Snakes", Systems, Man, and Cybernetics, 1997, Computational Cybernetics and Simulation, 1997 IEEE International Conference on Orlando, FL., Oct. 12-15, 1997, New York, NY, IEEE, vol. 4, Oct. 12, 1997, pp. 3660-3665, XP010249167.

Nakamura, T. et al., "On-line Visual Learning Method for Color Image Segmentation and Object Tracking", intelligent Robots and Systems, 1999, IROS International Conference on Kyongju, South Korea, Oct. 17-21, 1999, Piscataway, NJ, IEEE, vol. 1, Oct. 17, 1999, pp. 222-228, XP010362569.

Cheng, H. D., et al., "Color Image Segmentation: Advances and Prospects", Pattern Recognition, Elsevier, Kidlington, GB, vol. 34, No. 12, Dec. 2001, pp. 2259-2281, XP004508355.

Raboisson, S. et al., "Obstacle Detection in Highway Environment by Colour CCD Camera and Image Processing . . . ", Proc. 1999 IEEE/RJS ICIRS, Oct. 24, 1994, pp. 44-49, XP010258322.

Tomita, A. et al., "A Visual Tracking System for Sports Video Annotation in Unconstrained Environments", Image Processing, 2000, Proceedings, 2000 International Conference on Sep. 10-13, 2000, Piscataway, NJ, IEEE, vol. 3, Sep. 10, 2000, pp. 242-245, XP010529448.

European Search Report issued on Dec. 5, 2005.

\* cited by examiner (a) 
Initial state (b) 
State 1

(c) 
State 2

(d) 
State 3

(e) 
State 4

(f) 
State 5

(a)

(b)

OBJECT INFORMATION PROCESSING APPARATUS, IMAGE PROCESSING SYSTEM, GAME APPARATUS AND IMAGE PROCESSING METHOD

BACKGROUND OF THE INVENTION

1. Field of the Invention

The present invention relates to an object information processing apparatus for processing input image data to obtain information about an object contained in the image, an image processing system having a function of recognizing the object contained in the image using the object information, and a game apparatus and an image processing method using the image processing system.

2. Description of the Related Art

As high-performance and low-cost image pickup devices (e.g., CCDs, CMOS imagers, etc.), image processing DSP devices, and the like have been developed, a number of products have incorporated a camera module. Recently, camera modules are often employed even in mobile devices (e.g., cellular telephones, etc.), toys, peripheral devices thereof, and the like.

Camera modules are utilized to input image data. Such an image data input method can handle a large amount of information simultaneously and therefore is considerably efficient compared to data input methods which employ a key board, a jog dial, a joystick or the like to input operating commands.

However, in conventional image data input methods using a camera module, input image data is typically displayed as an input image on a monitor screen, and subsequently a final process, i.e., various judgment (store or send data, etc.) is performed by a human.

In some game apparatus or the like, the user performs actual movements in order to enhance virtual reality. To this end, a number of techniques for sensing movements have been developed. Particularly, if the movements of the user can be input as image data into an image processing system so that the movements can be recognized, this technique may be useful for game apparatuses.

After the movements of the user have been input as image data to an image processing system, the central processing unit (CPU) of a computer needs to be used to eventually recognize the movements of the user. Before the eventual recognition, it is necessary to extract required information from the image data. Conventionally, a number of techniques for extracting an object from image data have been proposed.

For example, an object recognition apparatus for recognizing a moving object has been proposed in Japanese Laid-Open Publication No. 6-266841. In this technique, a stationary object is detected in image data by feature extraction; background data is obtained; and the background data is subtracted from current image data to recognize a moving object.

Japanese Laid-Open Publication No. 63-88684 discloses an object recognition method, in which a luminosity gradient vector is calculated based on the luminosity concentrations of adjacent pixels, and a difference in angle of the luminosity gradient vector is used to recognize an object.

Japanese Laid-Open Publication No. 59-132075 discloses an image processing apparatus, in which only the contour of an object is stored in an image memory before recognition is performed by a central processing unit in order to reduce a processing time required for recognition.

The above-described conventional object recognition apparatus (Japanese Laid-Open Publication No. 6-266841) requires a memory for storing a large amount of data for each step of object feature extraction, stationary object recognition, background data calculation, image subtraction, and moving object recognition. These steps require a large computation amount. Moreover, if real-time processing is required for the step, a high-performance CPU or processing operation circuit needs to be employed.

Also in the conventional object recognition method (Japanese Laid-Open Publication No. 63-88684), image data needs to be stored in order to compare image data between adjacent pixels during processing operations, and therefore, an image memory for storing at least one frame of image data is required.

Also in the conventional image processing apparatus (Japanese Laid-Open Publication No. 59-132075), data representing the contour of an object is stored in a memory before object recognition is performed by a CPU, and therefore, it is not easy to perform object recognition in real time. Particularly, real-time object recognition cannot be achieved by a CPU having poor processing performance or a one-chip microcomputer incorporating the CPU are used. In the image processing apparatus, an image memory for storing data representing the contour of an object is required, so that it is not easy to reduce cost.

In the above-described object recognition techniques, sophisticated processing operations are performed using an image memory to carry out complicated extraction for object recognition. Therefore, a memory for storing a large amount of image data for image processing and a CPU or processing operation circuit for processing the data at high speed are required, so that it is not easy to achieve an image processing system at low cost. Therefore, use of image data for data input is not suitable for inexpensive products, such as toys or the like, although it is effective as a data input method.

The variety and quantity of object extraction information obtained by conventional object recognition techniques are large, information required for object recognition varies depending on the image processing system.

SUMMARY OF THE INVENTION

According to an aspect of the present invention, an object information processing apparatus for obtaining object information from input image data comprising pixels is provided, which comprises: an object determination section for determining whether or not each pixel is a part of an object to be extracted by comparing color information indicating a color of the pixel with a predetermined reference value for the object; and an object information retaining section for retaining coordinate data of the pixel as the object information if the pixel has been determined by the object determination section to be a part of the object to be extracted.

In one embodiment of this invention, the object determination section comprises: a first to an $n^{th}$ comparison sections for determining whether or not the color information of each pixel of the input image satisfies a first to an $n^{th}$ object conditions, respectively (n: natural integer); and an AND circuit for receiving n outputs of the first to the $n^{th}$ comparison sections.

In one embodiment of this invention, the object information processing further comprises: an image data conversion section provided before the object determination section, for converting an UYVY value of the input image data to an HSV value. The object determination section compares the HSV value of each pixel output by the image data conversion section with the predetermined reference value to determine whether or not the pixel is a part of the object to be extracted.

In one embodiment of this invention, the image data conversion section has a first conversion table for converting an UV value of the input image data to an H (hue) value, and a second conversion table for converting the UV value of the input image data to an S (saturation) value, and the image data conversion section outputs a Y value of the input image as a V (lightness) value.

In one embodiment of this invention, the object information processing apparatus further comprises: a noise removal section for removing noise from a result of determination by the object determination section.

In one embodiment of this invention, the noise removal section comprises: a shift resistor section for successively retaining the result of determination by the object determination section; and a noise removal determination section for determining whether or not a predetermined number or more of a plurality of results of the shift resistor section are equal to one another to determine whether or not the plurality of results are noise.

In one embodiment of this invention further comprises: an object inclusion relation determination section for determining whether a pixel of the input image data which has been determined by the object determination section to be a part of an object to be extracted is a part of an already detected object or of a new object which has not been detected, and generating coordinate data of the pixel. The object information retaining section retains the coordinate data generated by the object inclusion relation determination section for each detected object.

In one embodiment of this invention, the object inclusion relation determination section generates four coordinate points: coordinates having maximum X, coordinates having minimum X, coordinates having maximum Y, and coordinates having minimum Y, where coordinates of the object are (X, Y).

In one embodiment of this invention, when a pixel of the input image data appears which has been determined by the object determination section to be a part of an object to be extracted, the object inclusion relation determination section determines whether or not there is another pixel satisfying the same object condition, and when there is another pixel satisfying the same object condition, the other pixel is determined to be a part of the object and the coordinate data (X, Y) of the object is updated.

In one embodiment of this invention, when a pixel of the input image data appears which has been determined by the object determination section to be a part of an object to be extracted and the object inclusion relation determination section determines that there is no pixel satisfying the same object condition, the pixel is determined to be a part of a newly detected object and information about the pixel is stored in the object information retaining section corresponding to the newly detected object.

In one embodiment of this invention, when a plurality of object extraction conditions are provided, the object information retaining section retains a condition matching flag indicating which object condition is satisfied as a part of the object information.

In one embodiment of this invention, the object information retaining section retains one frame of object information of an object which has been determined to be an object to be extracted.

According to another aspect of the present invention, an image processing system is provided, which comprises: the above-described object information processing apparatus; an image data output apparatus for outputting image data into the object information processing apparatus; and a control apparatus for controlling the object information processing apparatus and the image data output apparatus.

In one embodiment of this invention, the image data output apparatus is provided with an image pickup device for taking an object image, and coordinate data of the object indicating a location of the object is coordinate data on the image pickup device.

In one embodiment of this invention, the control apparatus comprises a processing operation section for reading out object information stored in the object information processing apparatus and performing a processing operation for recognizing an object contained in image data.

In one embodiment of this invention, the processing operation section reads out the object information from the object information processing apparatus on a frame-by-frame basis.

In one embodiment of this invention, the processing operation section reads out the object information, which has been extracted on a frame-by-frame basis, from the object information processing apparatus and compares the object information between frames to detect movement or change of an object.

In one embodiment of this invention, the control apparatus recognizes that the object is moving in a predetermined direction when coordinate data of the object is changed in the predetermined direction between each of a plurality of consecutive frames.

In one embodiment of this invention, the control apparatus recognizes that the object is looming toward a viewing site when a coordinate location of the object is not changed and a size of the object is expanding between each of a plurality of consecutive frames in coordinate data of the object.

In one embodiment of this invention, the control apparatus recognizes that the object is moving away from a viewing site when a coordinate location of the object is not changed and a size of the object is shrinking between each of a plurality of consecutive frames in coordinate data of the object.

In one embodiment of this invention, when the object has at least two colors, the control apparatus recognizes a behavior of the object when each color of the object is moved between each of a plurality of consecutive frames.

According to another aspect of the present invention, a game apparatus, which recognizes a behavior of an object using the above-described image processing system, is provided.

According to another aspect of the present invention, an image processing method is provided, which comprises the steps of: outputting image data from an image data output apparatus to an object information processing apparatus; converting a UYVY value of the input image data to an HSV value using the object information processing apparatus, comparing the HSV value of each pixel with a reference value provided for an object to be extracted to determine whether or not the pixel is a part of the object to be extracted, and storing coordinate data of the pixel which has been determined to be a part of the object to be extracted as object information on an object-by-object basis; and reading the object information stored in the object information processing apparatus using a processing operation section of a control apparatus on a frame-by-frame basis and recognizing an object contained in image data based on the object information.

In one embodiment of this invention, the processing operation section of the control apparatus reads out the object information, which has been extracted on a frame-by-frame basis, from the object information processing apparatus and compares the object information between each frame to detect movement or change of an object.

Functions of the present invention will be described below.

According to the present invention, image data from the image data output section (e.g., a camera module, etc.) is serially processed by the object information processing apparatus on a pixel-by-pixel basis, and the coordinate data of an object to be extracted is stored in the object information storing section of the object information processing apparatus. As is different from conventional techniques, image data itself is not stored in a memory. Only the coordinate data of an object to be extracted is stored. Therefore, in the present invention, a large-capacity memory, such as a frame memory, a line memory or the like, is not required. Object information, such as coordinate data or the like, stored in the object information storing section is rewritten as appropriate. In some cases, all data may be rewritten in the object information storing section. Therefore, it is preferable that a resistor in which all bits can be simultaneously accessed is used instead of a memory device, such as RAM or the like.

According to the present invention, an object contained in an image is extracted by comparing a value indicated by color information contained in image data with a reference value using the object information processing apparatus. Therefore, as is different from conventional techniques, complicated processing flow using a CPU for object extraction or the like is not required. The coordinate data of an extracted object can be used to recognize the object contained in an image using the processing operation section, such as a CPU, a processing operation circuit or the like. Therefore, image processing load on the image processing operation section can be significantly reduced.

Therefore, according to the present invention, a large-capacity memory for storing image data is not required. In addition, a relative low-performance CPU, processing operation circuit or the like can be used. Therefore, the size and cost of an image processing system capable of recognizing an object can be significantly reduced.

An object can be recognized from an image by a method for determining the shape of the object, a method for determining a difference in color of images, and a combination thereof. In the present invention, an object is recognized based on the color of its image. In this case, the image data conversion section converts the UYVY value of image data output by the image data output section to the object information processing apparatus to an HSV value, and it is preferably determined whether or not image data is a part of an object to be extracted, based on the HSV value.

Hue (H) and saturation (S) are typically represented by a color wheel having 0 degrees to 360 degrees. Hue is represented by an angle on the color wheel and saturation is represented by a size (distance) from the center of the color wheel. Therefore, a color can be specified as follows: for example, "a hue is between 10 degrees to 20 degrees and a saturation is 10 or more". In contrast, a UV value represents color information in a two-dimensional coordinate system. It is possible to specify a color with a UV value. However, it is not easy to determine a UV value range which matches the sensitivity of a human. In order to specify a color range which matches the sensitivity of a human, the color range is preferably represented by an area on a disk defined by an angle and a size (radius).

The UYVY value-HSV value conversion is performed using a conversion table. The UYVY value-HSV value conversion can be completed in a clock cycle of an image transfer clock signal and can be thus performed in real time without using a fast clock signal.

Analog signals, such as images taken by a camera module or the like, contain noise or ambiguous signals. Therefore, it is preferable to provide a noise removal section which removes noise from the results of determination by the object determination section.

An object which the object determination section determines is to be extracted may be a part of an already detected object. Therefore, it is preferable that the object inclusion relation determination section determines whether the object is a part of the already detected object or a new object which has not been detected so far. The object inclusion relation determination section generates data indicating the coordinates having maximum X, the coordinates having minimum X, the coordinates having maximum Y, and the coordinates having minimum Y, of coordinates (X, Y). Objects can be recognized using data of the four coordinate points, thereby making it possible to further reduce the amount of data.

The information of an object stored in the object information storing section can be read out by the processing operation section on a frame-by-frame basis. Therefore, the object information storing section (e.g., a resistor, etc.) stores only one frame of coordinate data of an object which is determined to be an object to be extracted, thereby making it possible to reduce the amount of data to be stored.

The processing operation section reads out the coordinate data of an object from the object information storing section on a frame-by-frame basis, and the coordinate data of the object is compared between each frame, thereby making it possible to detect movement or change of the object. In this case, the coordinate data of an object can be temporarily retained in a resistor instead of a memory, so that the retained coordinate data can be compared with input data of the next frame to detect movement or change of an object.

Thus, the invention described herein makes possible the advantage of providing an object information processing apparatus capable of obtaining information required for object recognition in few types and in small quantities; an image processing system capable of relatively easily recognizing an object and detecting movement or change of an object using the object information; a game apparatus and an image processing method using the same.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

Figure 1:
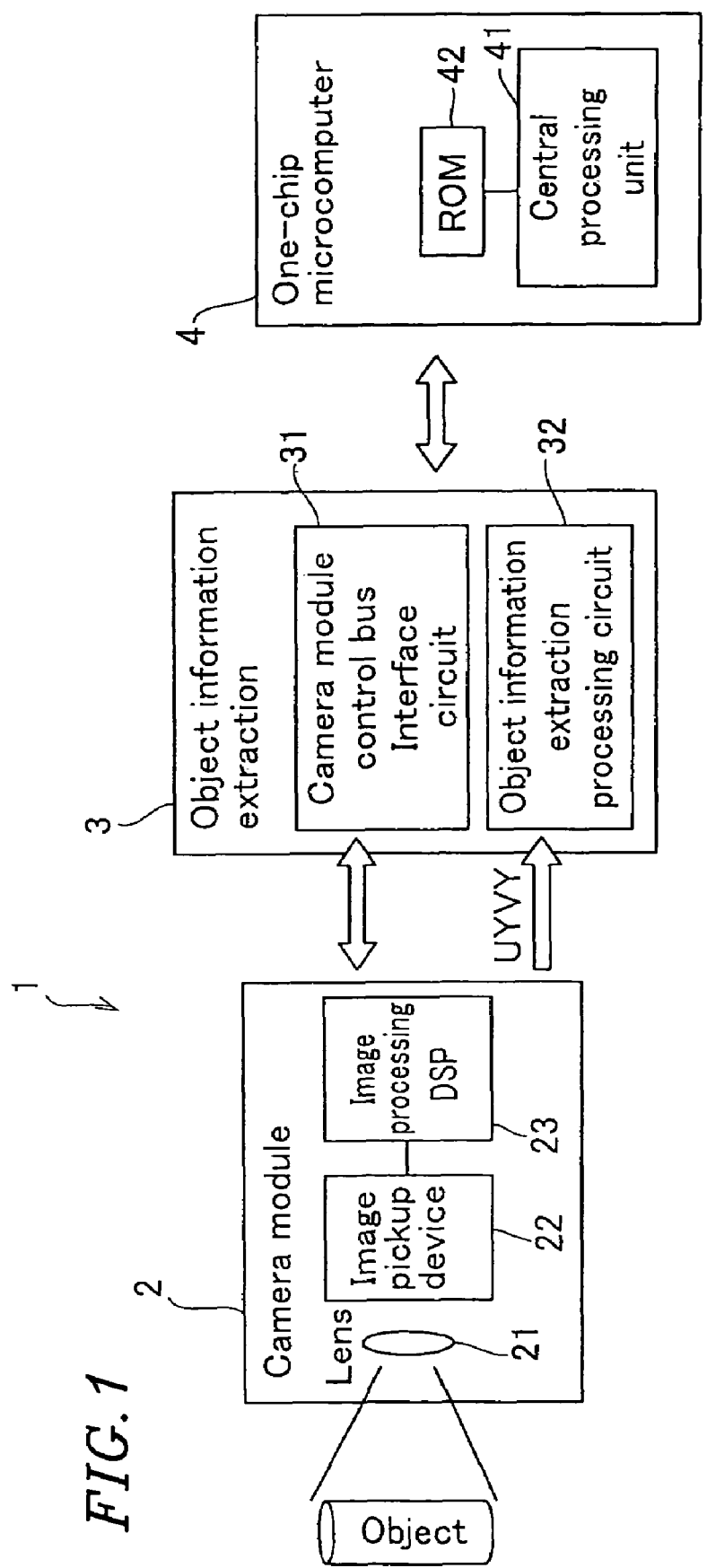
FIG. 1 is a block diagram showing a major configuration of an image processing system according to an embodiment of the present invention.

FIG. 1 is a block diagram showing a major configuration of an image processing system according to an embodiment of the present invention.

In FIG. 1, an image processing system 1 comprises a camera module 2 as an image data output device, an object extraction LSI 3 as an object information processing device, and a one-chip microcomputer 4 which is a control device for controlling the camera module 2 and the object extraction LSI 3.

The camera module 2 comprises a lens 21, an image pickup device 22 (e.g., a CCD, a CMOS imager, etc.), and an image processing DSP 23.

Data needs to be communicated between the image processing DSP 23 and the one-chip microcomputer 4 in order to control camera module 2. The image processing DSP 23 performs communication via an interface circuit (not shown), such as a I2C bus or the like. Such an interface circuit is often not incorporated in the inexpensive one-chip microcomputer 4. In this embodiment, the object extraction LSI 3 is provided with a camera module controlling bus interface circuit 31 described below.

The object extraction LSI 3 comprises the camera module controlling bus interface circuit 31 for interfacing between the camera module 2 and the one-chip micro computer 4 and an object information extraction circuit 32. The object information extraction circuit 32 compares, for each pixel, a value indicated by color information contained in image data output by the camera module 2 with a reference value for an object to be extracted to determine whether or not an object is to be extracted. When it is determined that an object is to be extracted, the coordinate data of the object to be extracted is stored.

The object extraction LSI 3 has a small circuit scale, and therefore, can be incorporated into the image processing DSP 23 or the one-chip microcomputer 4 of the camera module 2. In this embodiment, the object extraction LSI 3 is a discrete unit so that a general-purpose camera module 2 and one-chip microcomputer 4 can be used to construct a system.

The one-chip microcomputer 4 comprises a CPU 41 as a control section, a ROM 42 as a memory section, and the like. The ROM 42 stores an image processing control program. The camera module 2 and the object extraction LSI 3 are controlled in accordance with the image processing control program stored in the ROM 42 to recognize an object contained in an image and detect movement or change of the object.

The one-chip microcomputer 4 is connected to an input setting section (not shown). The user appropriately enters inputs via the input setting section to provide settings for the camera module 2 and the object extraction LSI 4. For the camera module 2, an image data output format, a gain, a white balance, and the like are set. For the object extraction LSI 3, reference values of the hue (H), saturation (S) and lightness (Y) of an object to be extracted, reference values for determining the inclusion relation of an object, and the like are set. For example, the following extraction condition (reference values) may be provided: "an object has a hue in the range from 20 degrees to 30 degrees, a saturation in the range of 50% or more, and a lightness in the range of 30% or more. Two objects are determined to be the same if the distance there between is within 3 pixels". The number of extraction conditions is not limited to one. A plurality of extraction conditions may be provided.

Figure 2:
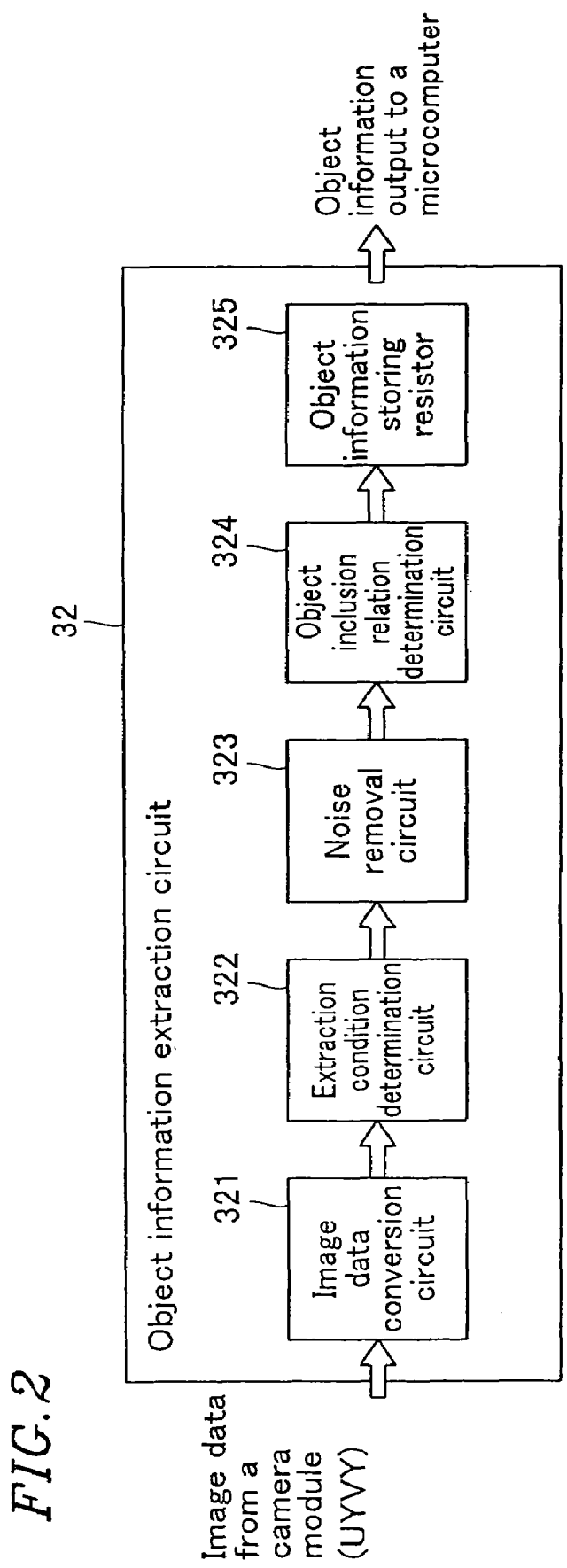
FIG. 2 is a block diagram showing a major configuration of an object information extraction circuit of FIG. 1.

FIG. 2 is a block diagram showing a major configuration of the object information extraction circuit 32 of FIG. 1.

In FIG. 2, the object information extraction circuit 32 comprises an image data conversion circuit 321 as an image data conversion section, an object extraction condition determination circuit 322 as a determination section, a noise removal circuit 323 as a noise removal section, an object inclusion relation determination circuit 324 as an object inclusion relation determination section, and an object information storing register 325 as an object information storing section (object information storing section).

The image data conversion circuit 321 format-converts the UYVY value of image data output by the camera module 2 to an HSV value.

In the extraction condition determination circuit 322, the HSV value of each pixel output by the image data conversion circuit 321 is compared with a reference value given to an object to be extracted to determine whether or not input image data contains an object to be extracted.

The noise removal circuit 323 removes noise based on the result of determination by the extraction condition determination circuit 322.

The object inclusion relation determination circuit 324 determines whether an object which has been determined to be an object to be extracted is a part of an object which has been already extracted or a new object which has not been extracted. The object inclusion relation determination circuit 324 produces coordinate data of the object. In this embodiment, the coordinate data of an object includes the coordinates having maximum X, the coordinates having minimum X, the coordinates having maximum Y and the coordinates having minimum Y, of the object.

The object information storing register 325 stores the coordinate data of each object which has been determined to be an object to be extracted. In this embodiment, for example, one frame of coordinate data is stored in the object information storing register 325 for each object which has been determined to be an object to be extracted.

In this embodiment, a register is used as the object information storing section 325. The reason will be described below.

Specifically, extracted object information is rewritten if required, and all extracted object information may be rewritten at a time. Therefore, a register is preferably used, in which all bits can be simultaneously assessed. Memory devices, such as RAM and the like, have high gate efficiency, however, the number of bits which can be simultaneously accessed via an I/O portion is limited. Therefore, in this embodiment, a register is used to construct an object information storing section.

Hereinafter, an object information extraction method using the above-described object information extraction circuit 32 will be described.

Figure 3:
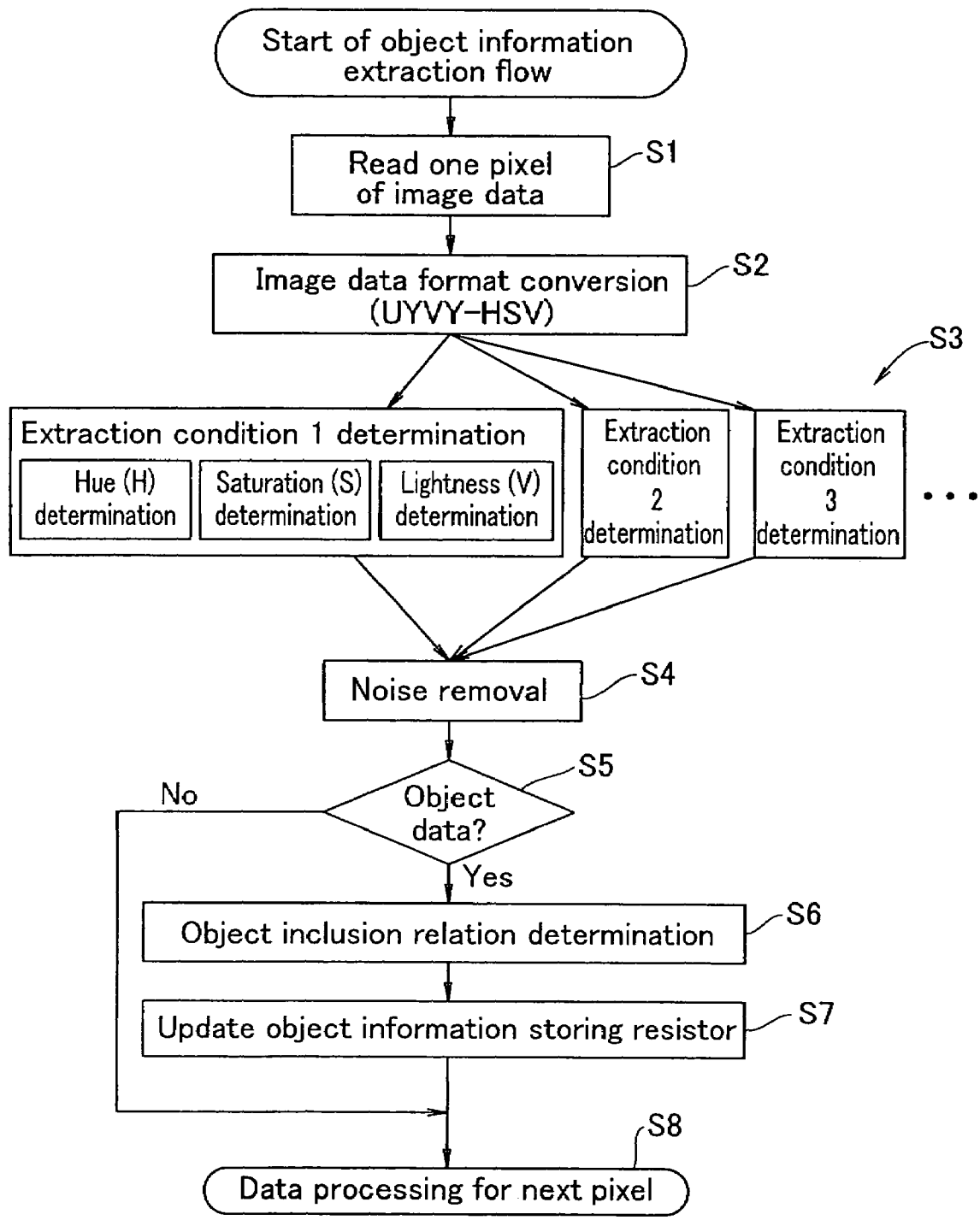
FIG. 3 is a flowchart showing a control flow of object information extraction by the object information extraction circuit of FIG. 2.

FIG. 3 is a flowchart showing a control flow of object information extraction by the object information extraction circuit 32 of FIG. 2.

In step S1, image data (UYVY) output by the camera module 2 is input to the image data conversion circuit 321 of the object extraction LSI 3 on a pixel-by-pixel basis.

In step S2, the image data format conversion is performed. In step S2, the image data conversion circuit 321 performs format conversion of the UYVY value of color information contained in input image data to an HSV value. The reason the UYVY value of input image data is converted to an HSV value is that a hue (H) and a saturation (S) are represented by an angle and a size (distance) from the center of a color wheel ranging from 0 degrees to 360 degrees, and it is easy to specify a range based on the sensitivity of a human.

Next, in step S3, extraction conditions are determined. In step S3, the extraction condition determination circuit 322 compares an HSV value output by the image data conversion circuit 321 with a reference value given to an object to be extracted on a pixel-by-pixel basis to determine whether or not input image data contains an object to be extracted. As can be seen from the flowchart, the object information extraction flow has no feedback due to a conditional branch or the like and proceeds to subsequent steps straightforwardly. Therefore, it is possible to readily construct a circuit capable of performing extraction condition determination processes having different conditions in parallel.

In step S4, noise removal is performed. Instep S4, the noise removal circuit 323 removes noise from the result of determination by the extraction condition determination circuit 322.

In step S5, it is determined whether or not data is a part of an object to be extracted, based on the result of determination by the extraction condition determination circuit 322 from which noise has been removed. If the data is determined to be a part of an object to be extracted in step S5 (Yes), the process goes to step S6. On the other hand, if the data is determined not to be a part of an object to be extracted in step S5 (No), the process goes to step S8 and the next pixel data is processed.

In step S6, object inclusion relation is determined. In step S6, The object inclusion relation determination circuit 324 determines whether an object which has been determined in step S5 to be an object to be extracted is a part of an object which has been already extracted or a new object which has not been extracted. The object inclusion relation determination circuit 324 produces coordinate data of the object.

In step S7, values stored in the object information storing register 325 are updated. The coordinate data of each object which has been determined to be an object to be extracted is newly retained. Thereafter, the process goes to step S8 where the next pixel data is processed.

Hereinafter, the processes in the components of FIG. 2 and the object extraction process flow of FIG. 3 will be described in greater detail.

The image data format conversion in step S2 and the image data conversion circuit 321 of FIG. 2 will be described in detail.

Figure 4:
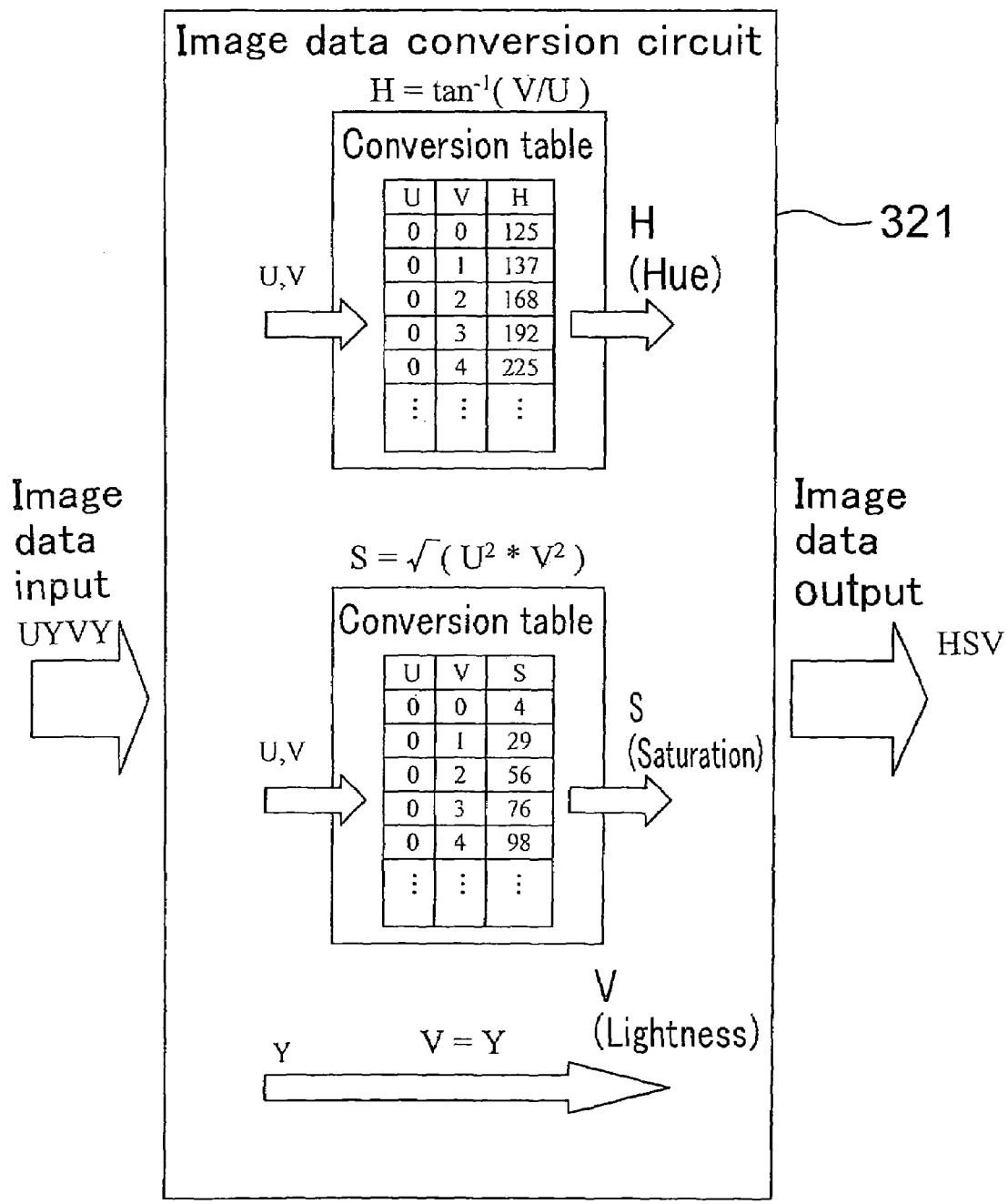
FIG. 4 is a diagram for explaining an image data conversion of an image data conversion circuit of FIG. 2.

FIG. 4 is a diagram for explaining the image data conversion of the image data conversion circuit 321 of FIG. 2.

In FIG. 4, the image data conversion circuit 321 has a conversion table for converting a (U, V) value of input image data to an H value representing a hue and a conversion table for converting a (U, V) value of input image data to an S value representing a saturation. An H value and an S value which have been obtained by the image data conversion circuit 321 are supplied to the extraction condition determination circuit 322. A lightness (Y value) of image data input to the image data conversion circuit 321 is supplied as a V value to the extraction condition determination circuit 322.

The above-described data conversion from a UYVY value to an HSV value contains multiplication and the like. Therefore, the data conversion is not completed by one cycle if a conventional processing operation is employed. In contrast, in this embodiment, an image memory, such as a frame memory or the like, is not used, so that image data is not stored in an image memory, and therefore, each process has to be performed in real time. To achieve this, an image data conversion method requiring a plurality of cycles is not preferable, and image data conversion has to be completed in one cycle. In this embodiment, the image data conversion circuit 321 is provided with the conversion table between UYVY values and HSV values so that input values and output values have a one-to-one relationship, thereby making it possible to complete image data conversion in one cycle.

As used herein, the term "one cycle" refers to a cycle of a clock which is used for image data format conversion. In this embodiment, the object information extraction circuit 32 does not generate a clock and the image data format conversion is performed in synchronization with image data UYVY transferred from the image processing DSP 23 of the camera module 2. One cycle is herein defined based on a time point and period in which one pixel of image data is transferred unless otherwise dictated.

Next, the extraction condition determination in step S3 and the extraction condition determination circuit 322 of FIG. 2 will be described in detail.

Figure 5:
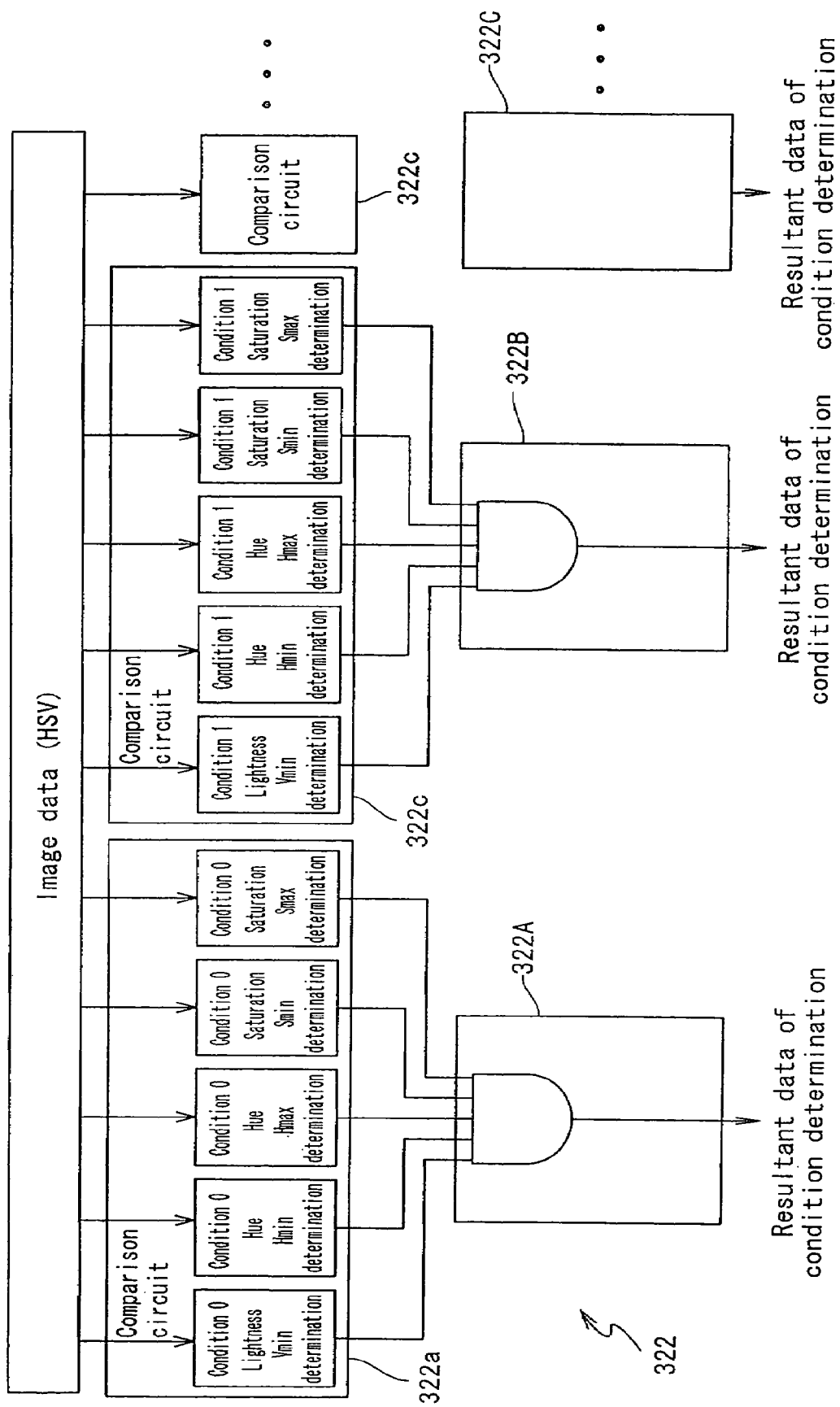
FIG. 5 is a block diagram showing a concrete exemplary configuration of an extraction condition determination circuit of FIG. 2.

FIG. 5 is a block diagram showing a concrete exemplary configuration of the extraction condition determination circuit 322 of FIG. 2.

In FIG. 5, the extraction condition determination circuit 322 comprises a comparison circuit 322a and a multi-input AND circuit 322A for determining whether or not a condition 0 for object extraction is satisfied; a comparison circuit 322b and a multi-input AND circuit 322B for determining whether or not another condition 1 for object extraction is satisfied; a comparison circuit 322c and a multi-input AND circuit 322C for determining whether or not another condition 2 for object extraction is satisfied; and so on.

Each of the comparison circuits 322a, 322b, 322c, . . . , determines whether or not each of a hue (H), a saturation (S) and a lightness (V) is within a predetermined value range. If the AND circuits 322A, 322B, 322C, . . . , determine that all the items satisfy the criteria, the AND circuit outputs a high-level output, i.e., it is determined that data satisfies a corresponding condition. The result of condition determination is represented by one-bit data which indicates whether or not the condition is satisfied. The one-bit data is transferred to the next process. The number of such bits is equal to the number of conditions.

For example, in the case of "Condition 0, Lightness Vmin determination" in the comparison circuit 322a, a lightness (V) of input image data is compared with "Vmin" which is a minimum lightness value for the condition 0 which is provided as a reference value in a resistor of the object extraction LSI 3 in advance by the one-chip microcomputer 4. In this case, if the lightness value V of input image data is greater than the lightness Vmin for the condition 0, the condition 0 is satisfied, so that the result of determination "1" is output to the AND circuit 322A. Similarly, condition determination is performed for hue H and saturation S.

As a result, for example, if the condition 0 is satisfied for all the items in the comparison circuit 322a, all the inputs to the AND circuit 322A are "1" and the output of the AND circuit 322A is also "1". The output "1" of the AND circuit 322A indicates that currently input data satisfy the condition 0. Similarly, condition 1, condition 2, are determined on a pixel-by-pixel basis, and the results of condition determination are supplied to the subsequent noise removal circuit 323.

Next, noise removal in step S4 and the noise removal circuit 323 of FIG. 2 will be described in detail. Note that analog signals, such as images taken by the camera module 2 or the like, contain various information and a large amount of noise or ambiguous signals. Digital processing encounters a problem of how to handle with noise or ambiguous signals. In this embodiment, for example, the extraction condition determination circuit 322 performs determination five times. Five determination results are retained in a shift register. If three or more of five pieces of data have the same determination results, it is determined that no noise is present and data is a part of an object to be extracted.

Figure 6:
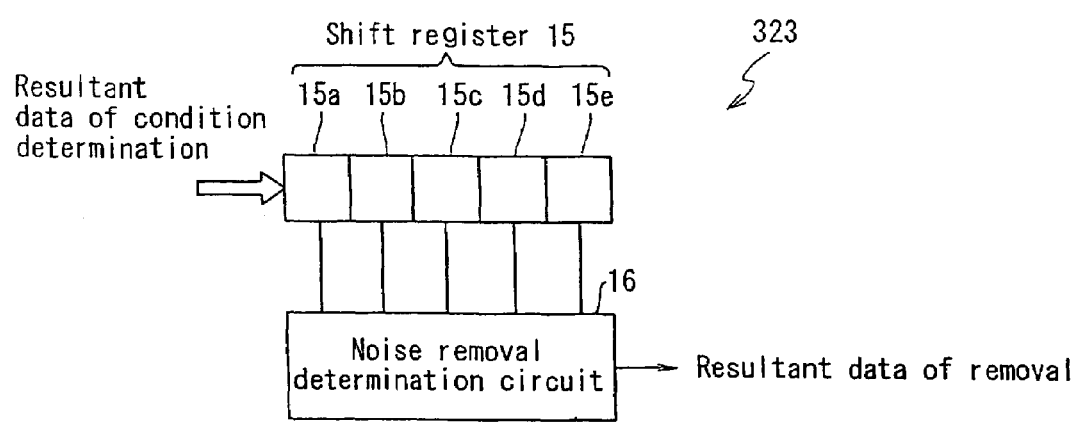
FIG. 6 is a block diagram showing a major configuration of a noise removal circuit of FIG. 2.

FIG. 6 is a block diagram showing a major configuration of the noise removal circuit 323 of FIG. 2.

In FIG. 6, the noise removal circuit 323 comprises a shift register 15 for retaining determination results and a noise removal determination circuit 16 for determining whether or not data is noise, based on the retained five determination results.

Data of the results of condition determination operations (the output of each AND circuit) is input from the extraction condition determination circuit 322 to the shift register 15. An output terminal of each unit 15a to 15e (5 units in FIG. 6) of the shift register 15 is connected to the noise removal determination circuit 16. The result of noise removal by the noise removal determination circuit 16 is output as noise removed data to the object inclusion relation determination circuit 324.

Figure 7:
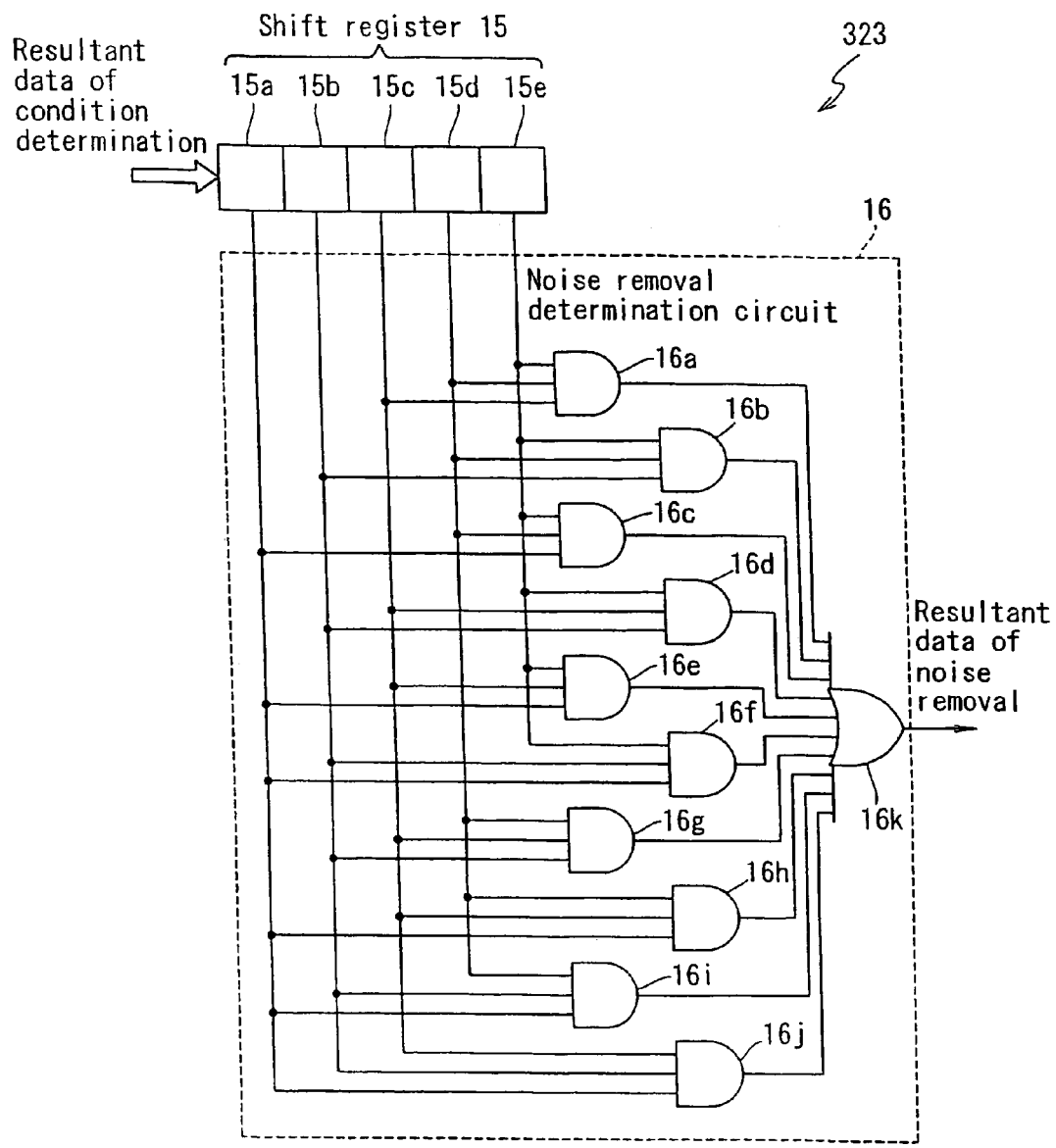
FIG. 7 is a circuit diagram showing a major configuration of the noise removal determination circuit of FIG. 2.

FIG. 7 is a circuit diagram showing a major configuration of the noise removal determination circuit 323 of FIG. 2.

In FIG. 7, the noise removal determination circuit 16 comprises AND circuits 16a to 16j and an OR circuit 16k. The input terminals of the AND circuit 16a are connected to the output terminals of from the third resistor unit 15c to the fifth resistor unit 15e. If all data in the resistor units 15c to 15e are "1", the AND circuit 16a outputs "1". Similarly, in the case of the AND circuits 16b to 16h, if all data in units (three units in FIG. 7) in the shift resistor 15 connected to input terminals of the AND circuit are "1", the AND circuit outputs "1". The output terminals of the AND circuits 16a to 16J are connected to the respective input terminals of the OR circuit 16k. If at least one of the AND circuits 16a to 16j outputs "1", the OR circuit 16k outputs "1". Therefore, if three or more of five pieces of data retained in the units of the shift resistor 15 are "1", the OR circuit 16k outputs "1" as data indicating the result of noise removal. In this case, it is determined that an object satisfying extraction conditions is present, but not noise.

Hereinafter, an exemplary, actual, concrete operation of the noise removal circuit 323 of FIG. 7 will be described in detail.

Figure 8:
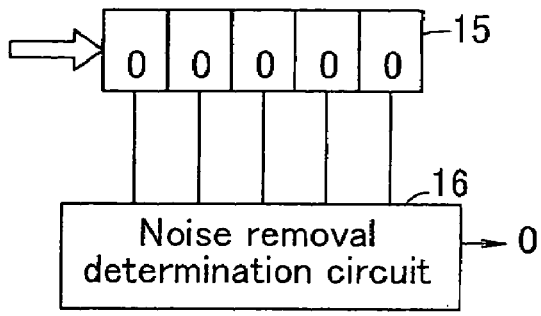
FIG. 8 is a diagram for explaining an exemplary operation of a noise removal circuit of FIG. 2.
Figure 8:
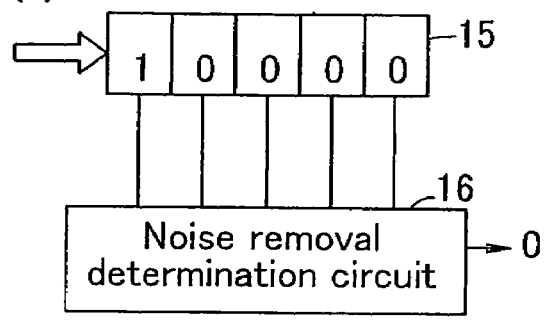
Figure 8:
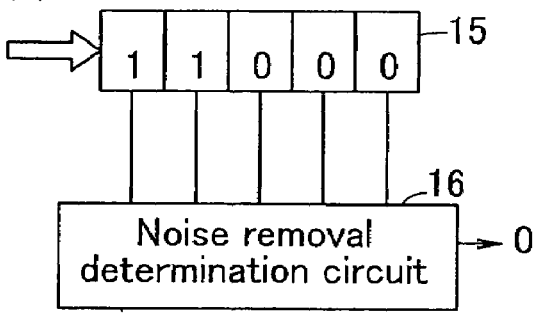
Figure 8:
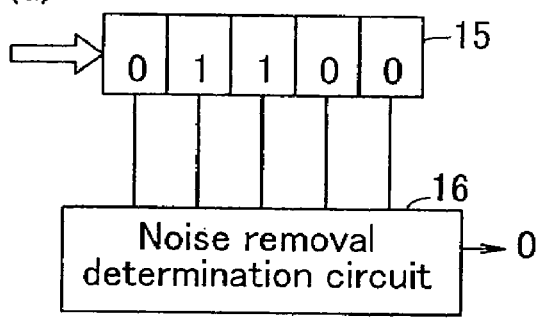
Figure 8:
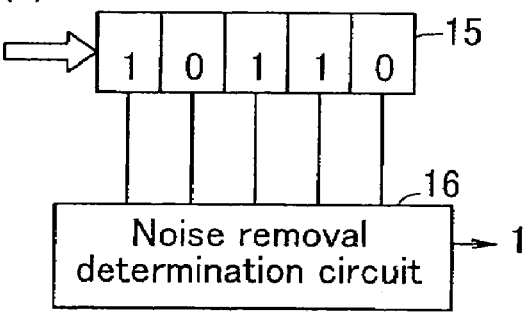
Figure 8:
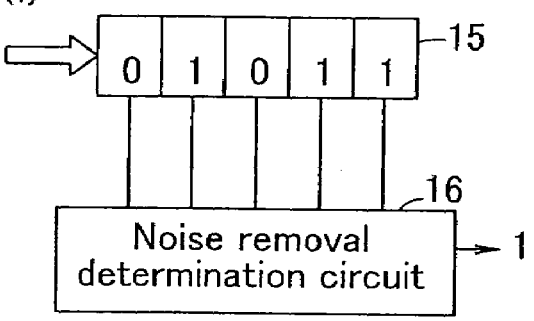

FIG. 8 is a diagram for explaining an exemplary operation of the noise removal circuit 323 of FIG. 2.

A portion (a) of FIG. 8 indicates an initial state of the noise removal circuit 323. In the initial state, all data in the five register units 15a to 15e are "0", the noise removal determination circuit 16 outputs "0" as data indicating the result of noise removal.

A portion (b) of FIG. 8 indicates that data is shifted by one unit, so that data "1" is read into the shift register 15 (state 1). In state 1, only the resistor unit 15a has data "1" among the five resistor units 15a to 15e, so that the processing result output by the noise removal determination circuit 16 is still "0".

A portion (c) of FIG. 8 indicates that another piece of data "1" is read into the shift register 15 (state 2). A portion (d) of FIG. 8 indicates that another piece of data "0" is read into the shift register 15 (state 3). In states 2 and 3, two resistor units have data "1" among the five resistor units 15a to 15e. In this case, the noise removal determination circuit 16 outputs "0" as data indicating the processing result.

A portion (e) of FIG. 8 indicates that another piece of data "1" is read into the shift register 15 (state 4). In state 4, three or more (here three) register units have data "1" among the five register units 15a to 15e. In this case, the noise removal determination circuit 16 outputs data "1" as data indicating the processing result.

A portion (f) of FIG. 8 indicates that another piece of data "0" is read into the shift register 15 (state 5). In state 5, three register units have data "1" among the five register units 15a to 15e. In this case, the noise removal determination circuit 16 still outputs data "1" as data indicating the processing result.

Note that the number of determination operations performed by the extraction condition determination circuit 322 is not limited to five. If the noise removal circuit 323 can determine whether or not data is a part of an object to be extracted, based on the number of register units having the same determination result, the number of register units in a shift register and the number of determination operations by the extraction condition determination circuit 322 are not particularly limited.

For example, if the number of determination operations is (2n−1) (odd number: n is an integer of 1 or more) and the majority of the (2n−1) register units have the same determination result, it may be determined that data input to the noise removal circuit 323 is a part of an object to be extracted but not noise. If the number of determination operations is 7, the shift register contains at least 7 resistor units.

For example, the number of determination operations is 2n (even number: n is an integer of 1 or more) and the majority of the 2n register units have the same result, it may be determined that data input to the noise removal circuit 323 is a part of an object to be extracted but not noise. For example, the number of determination operations is 6, the shift register contains at least 6 register units.

Next, the object inclusion relation determination in step S6 and the object inclusion relation determination circuit 324 of FIG. 2 will be described in detail.

If data appears which is determined to be a part of an object to be extracted by the processing and determination in steps S1 to S5, it is necessary to determine whether the data is a part of an object which has been already extracted or a new object which has not been extracted. In this embodiment, the object inclusion relation determination circuit 234 determines whether an object which has been determined to be an object to be extracted is a part of an object which has been already extracted or a new object which has not been extracted.

Figure 9:
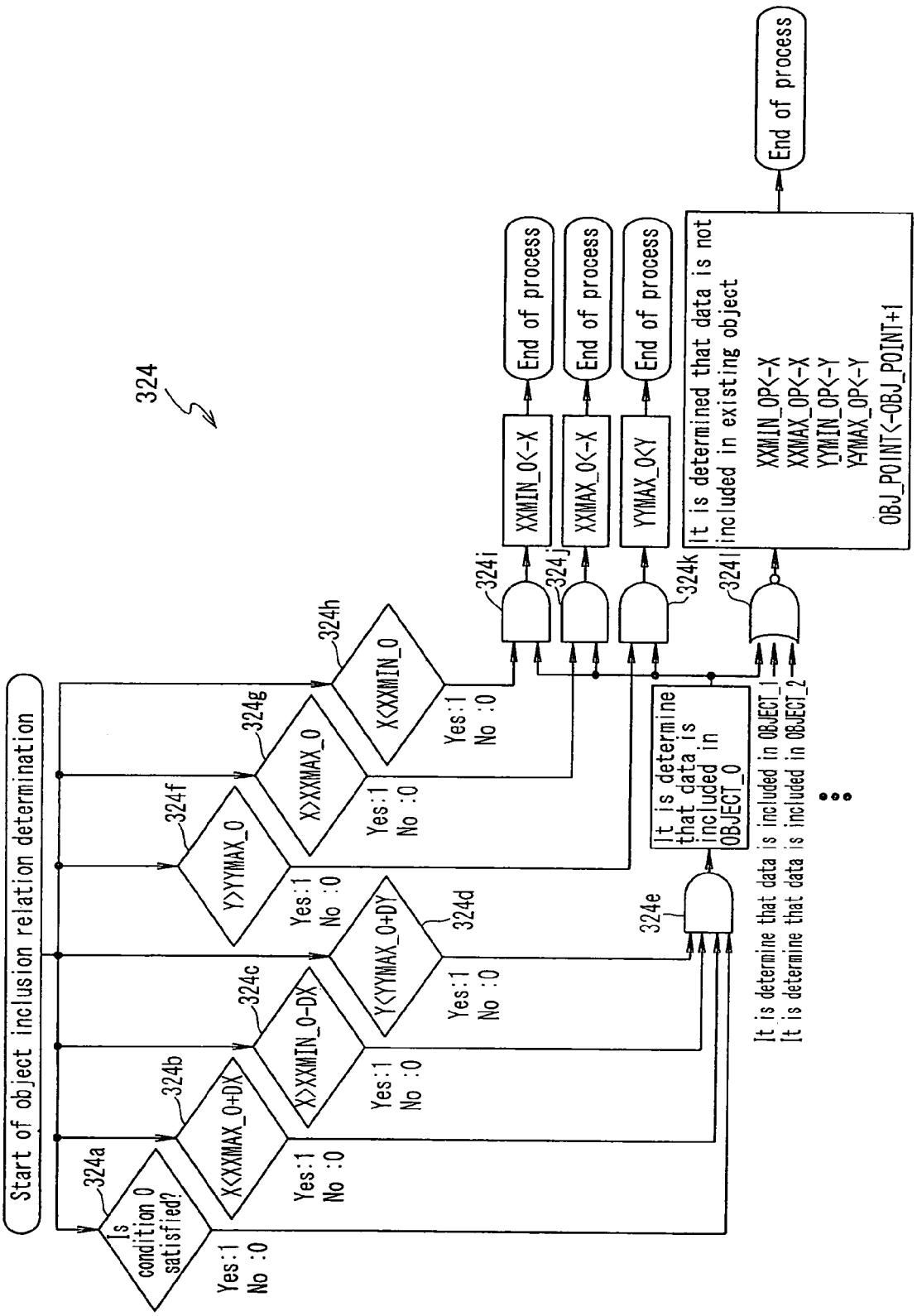
FIG. 9 is a flowchart showing an exemplary processing flow in object inclusion relation determination in step S6 of FIG. 3.

FIG. 9 is a flowchart showing an exemplary processing flow in object inclusion relation determination in step S6 of FIG. 3.

As shown in FIG. 9, when an object has been extracted, the object information storing register 325 stores coordinate data indicating the location of the object, i.e., coordinate data indicating the coordinates on the image pickup device 22. In addition, if a plurality of conditions are provided, a condition matching flag indicating which condition is satisfied by an object is retained.

For example, the following four pieces of coordinate data (coordinate information) are stored in the object information storing register 325:

Coordinates having maximum X: (XXMAX, YXMAX),
Coordinates having minimum X: (XXMIN, YXMIN),
Coordinates having maximum Y: (XYMAX, YYMAX), and
Coordinates having minimum Y: (XYMIN, YYMIN).

In addition to the location information of an object, the size, shape or the like of an object may be roughly determined, thereby making it possible to detect the movement and change of the object. Only coordinate data of four points is stored for an object, whereby the amount of data can be significantly reduced as compared to when entire image data is stored.

The image processing system 1 of this embodiment incorporates the object information storing register 325 for storing coordinate data, whose size is predetermined by expecting the number of objects to be extracted. Information of extracted objects is stored in the object information storing register 325 in order of chronology of extraction from the earliest. In FIG. 9, a pointer for indicating the ordinal number of a register for storing a newly extracted object, is represented by OBJ_POINT (OP).

As described above, analog signals indicating images taken by the camera module 2 or the like contains a large amount of noise or ambiguous signals. Therefore, adjacent pixels do not necessarily provide continuous data in an object. When data indicating an object to be extracted (first data) is obtained, it is determined whether or not another piece of data satisfying the same conditions (second data) is present in the vicinity of the object. If the second data is present within a predetermined distance from the first data, the second data needs to be determined to be a part of the object. The predetermined distance is a distance criterion for determining that the first and second data are of the same object. The one-chip microcomputer 4 sets the distance criterion in a register of the object extraction LSI 3. The object inclusion relation determination circuit 324 performs processing based on the distance criteria. In FIG. 9, the distance criterion is represented by (DX, DY).

Assuming that an already detected object (first data) has the following coordinates:

Coordinates having maximum X: (XXMAX, YXMAX),
Coordinates having minimum X: (XXMIN, YXMIN),
Coordinates having maximum Y: (XYMAX, YYMAX), and
Coordinates having minimum Y: (XYMIN, YYMIN), and that the location of another piece of data (second data) which is determined to satisfy the same conditions is represented by coordinates (X, Y), the coordinates of the second data are compared with the coordinates of the first data to determine whether or not the following expression is satisfied:

$XXMIN-DX<X<XXMAX+DX$, and $Y<YYMAX+DY$.

If the expression is satisfied, the first and second data are determined to be a part of the same object and the object information is updated. The update of the object information means that the minimum and/or maximum value of an X and/or Y coordinate are updated, and more specifically, data stored in the object information storing register 325 is updated to new minimum and/or maximum values.

In FIG. 9, the comparison circuit 324a compares coordinate data indicating coordinates (X, Y) which have been determined to satisfy the condition 0 (e.g., the output of the comparison circuit 324a is Yes: "1") with the coordinate data of an already detected object OBJECT_0 (e.g., an object satisfying the condition 0) using the comparison circuits 324b to 324d. If the coordinates (X, Y) satisfies the above-described expression, i.e., $XXMIN\_0-DX<X<XXMAX.\_0+DX$ (e.g., both of the outputs of the comparison circuit 324b and the comparison circuit 324c are Yes: "1"), and $Y<YYMAX.sub\_0+DY$ (e.g., the output of the comparison circuit 324d is Yes: "1"), the AND circuit 324e determines that the data indicating the coordinates (X, Y) is a part of the object OBJECT_0 (e.g., the output of the AND circuit 324e is "1").

Similarly, the determination as described above is performed for other objects OBJECT_1, OBJECT_2 (e.g., objects corresponding to the condition 1, the condition 2) . . . . The output of the AND circuit 324e is connected to the inputs of the AND circuit 324i to 324k.

If the coordinate data of the coordinate: (X, Y) is compared with the coordinate data YYMAX_0 of the already detected object OBJECT_0 using the comparison circuits 324f to 324h and $Y>YYMAX.\_0$ (e.g., the output of the comparison circuit 324f is Yes: "1" and the maximum value of the Y coordinate is updated) and the output of the AND circuit 324e is "1", the output of the AND circuit 324k is "1" and the coordinate data YYMAX_0 of the object OBJECT_0 in the object information storing register 325 is updated to Y.

If X>XXMAX._0

(e.g., the output of the comparison circuit 324g is Yes: "1" and the maximum value of the X coordinate is updated) and the output of the AND circuit 324e is "1", the output of the AND circuit 324j is "1", the coordinate data XXMAX_0 of the object OBJECT_0 in the object information storing register 325 is updated to X.

If X<XXMIN_0

(e.g., the output of the comparison circuit 324h is Yes: "1" and the minimum value of the X coordinate is updated) and the output of the AND circuit 324e is "1", the output of the AND circuit 324i is "1" and the coordinate data XXMIN_0 of the object OBJECT_0 in the object information storing register 325 is updated to X.

If the coordinate data indicating the coordinates (X, Y) matches no objects which have been detected, the coordinate data is determined to be a part of a new object and information of the data is stored in a new resistor in the object information storing register 325.

In FIG. 9, the coordinate data indicating the coordinates (X, Y) is compared with the coordinate data of the already detected objects OBJECT_0, OBJECT_1, OBJECT_2, . . . . If the coordinate data indicating the coordinates (X, Y) matches no objects which have been detected (e.g., all inputs of a NOR circuit 3241 are "0"), it is determined that the coordinates (X, Y) are not included in any already detected objects (e.g., the output of the AND circuit 324i is "0" In this case, X is written into coordinate data XXMIN_OP and XXMAX_OP of an object OBJECT_OP and Y is written into YYMIN_OP and YYMAX_OP thereof, in the object information storing register 325. In addition, the OBJ_POINT is incremented to OBJ_POINT+1 which is a pointer indicating a register in which a new object is to be stored.

In the object information extraction circuit 32 of the object information extraction LSI 3, the processing flow from step S1 to step S8 is repeatedly performed while one frame of image data is transferred from the camera module 2. The above-described serial processing is performed every time one pixel of image data is input. Information is updated in real time in the object information storing register 325. Therefore, at the time when one frame of image data has been completely transferred, information of the final result of image extraction is already stored in the object information storing register 325.

The above-described processing flow of object information extraction will be described by way of more concrete examples below.

In FIGS. 10A to 10E, a portion (a) of each of FIGS. 10A to 10E shows an exemplary manner of scanning image data. A portion (b) thereof indicates data states (A) to (E) of the object information storing register 325.

Figure 10A:
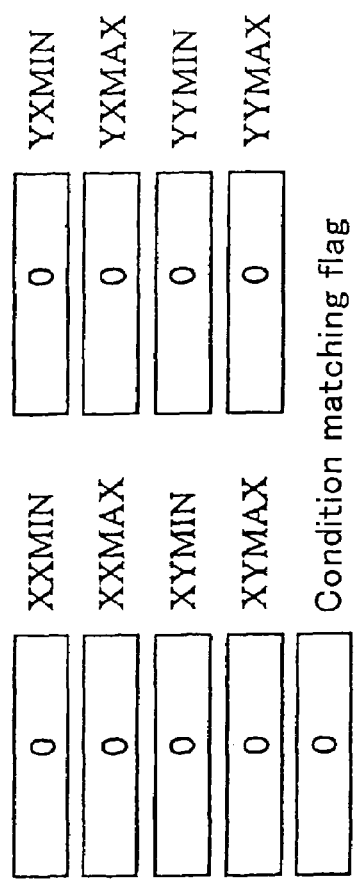
FIG. 10A is a diagram showing an exemplary manner of scanning image data according to an embodiment of this invention and a data state (A) of an object information storing register of the embodiment.
Figure 10A:
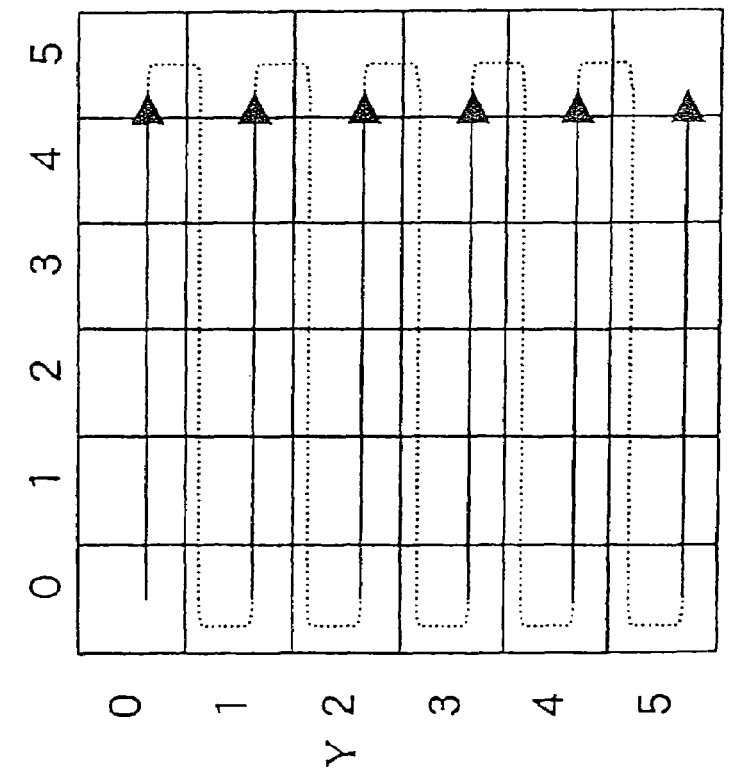

In FIG. 10A, transfer of image data begins from a point having coordinates (X, Y)=(0, 0). The image data is successively transferred along the X axis. Afterimage data on one line along the X axis is completely transferred, scanning is performed on the next Y coordinate: (one line along the X axis). In an initial state, the object information storing register 324 is empty, i.e., the entire register is filled with "0".

Figure 10B:
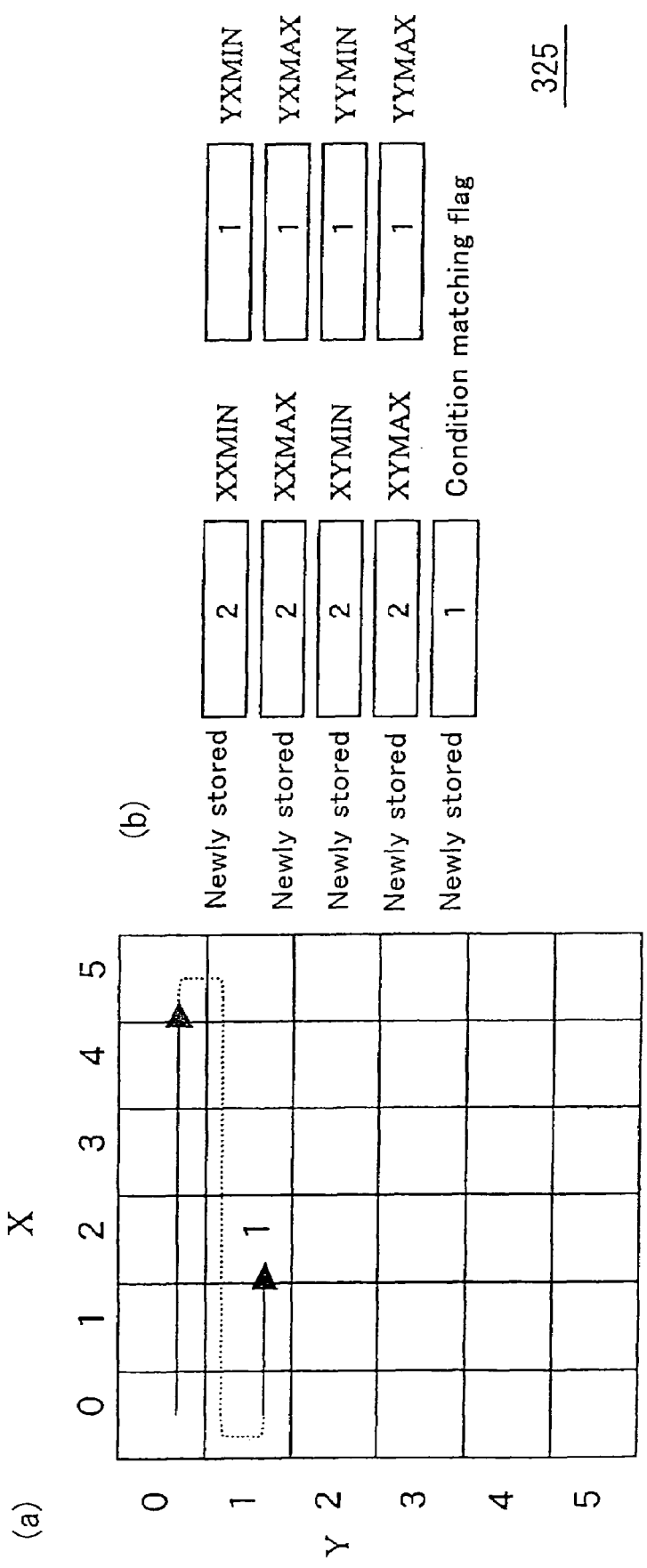
FIG. 10B is a diagram showing an exemplary manner of scanning image data according to an embodiment of this invention and a data state (B) of an object information storing register of the embodiment.

In FIG. 10B, the first data satisfying an extraction condition is detected at coordinates (2, 1). Since no object has been detected so far, the data is determined to be a part of a new object. In the object information storing register 324, the coordinates (2, 1) are written into:

Coordinates having maximum X: (XXMAX, YXMAX),
Coordinates having minimum X: (XXMIN, YXMIN),
Coordinates having maximum Y: (XYMAX, YYMAX), and
Coordinates having minimum Y: (XYMIN, YYMIN).

In this case, if a plurality of conditions are provided, a condition matching flag is employed in addition to the above-described information so as to indicate that the object satisfies the conditions.

Figure 10C:
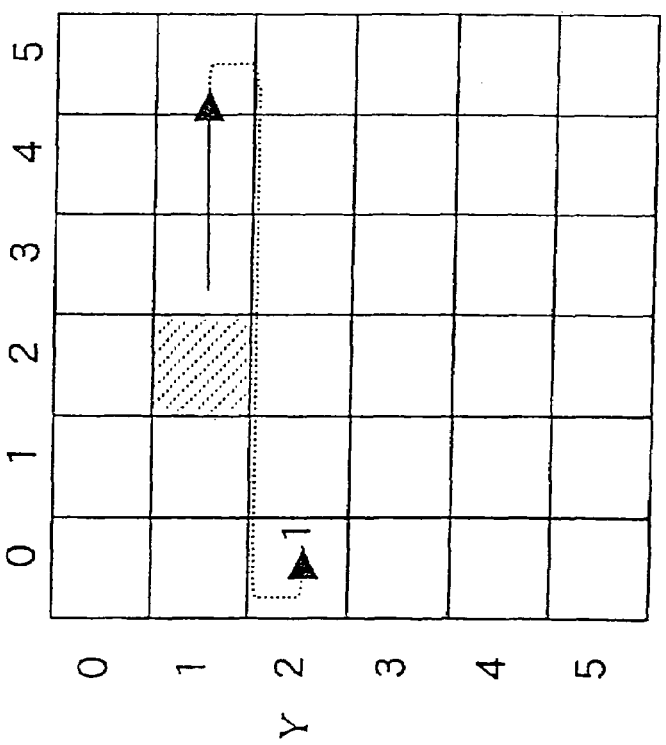
FIG. 10C is a diagram showing an exemplary manner of scanning image data according to an embodiment of this invention and a data state (C) of an object information storing register of the embodiment.

Subsequently, in FIG. 10C, data satisfying the object extraction condition is detected at coordinates (0, 2). In this case, the X coordinate value "0" of the coordinates are compared with XXMIN and XXMAX in the object information storing register 325 and the Y coordinate value "2" is compared with YYMIN and YYMAX. If the coordinates (0, 2) is located within an allowable range with respect to XXMIN, XXMAX, YYMIN and YYMAX, the data (coordinates (0, 2)) are determined to be a part of the same object already detected and information is updated in the object information storing register 325. It is now assumed that the coordinates (0, 2) satisfy the above-described condition.

In this case, the following data is updated to coordinates (0, 2):

Coordinates having minimum X: (XXMIN, YXMIN), and
Coordinates having maximum Y: (XYMAX, YYMAX).

Figure 10D:
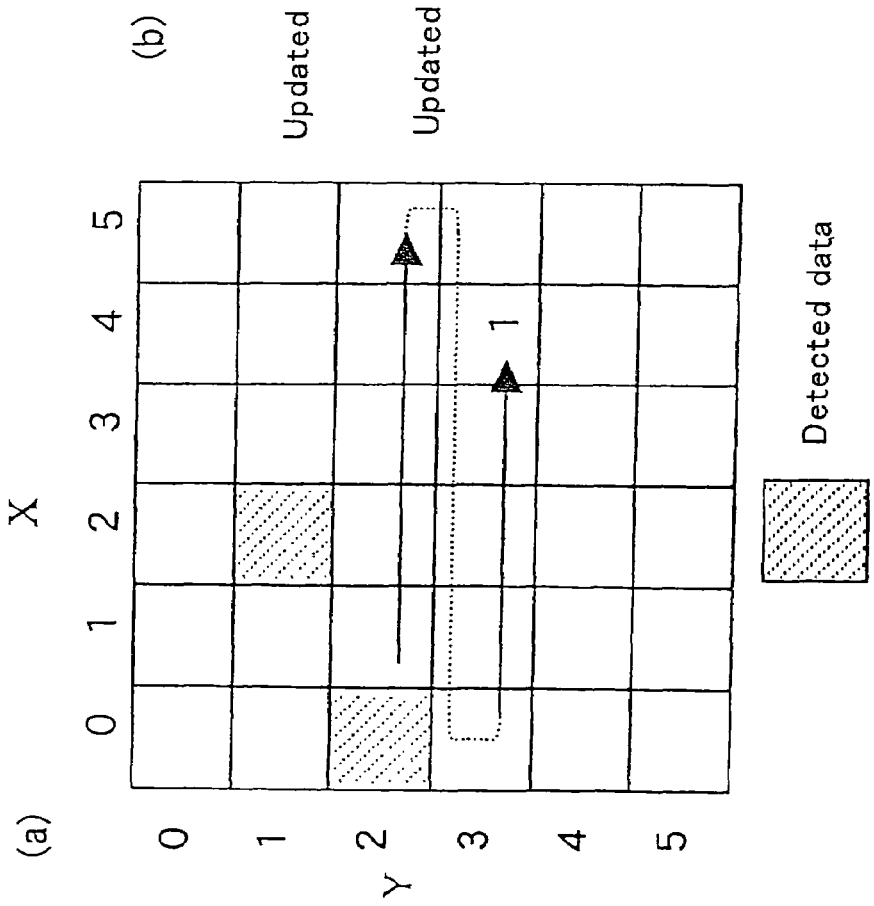
FIG. 10D is a diagram showing an exemplary manner of scanning image data according to an embodiment of this invention and a data state (D) of an object information storing register of the embodiment.

Similarly, in FIG. 10D, data satisfying the extraction condition is detected at coordinates (4, 3), and the following data is updated to coordinates (4, 3):

Coordinates having maximum X: (XXMAX, YXMAX), and
Coordinates having maximum Y: (XYMAX, YYMAX).

Figure 10E:
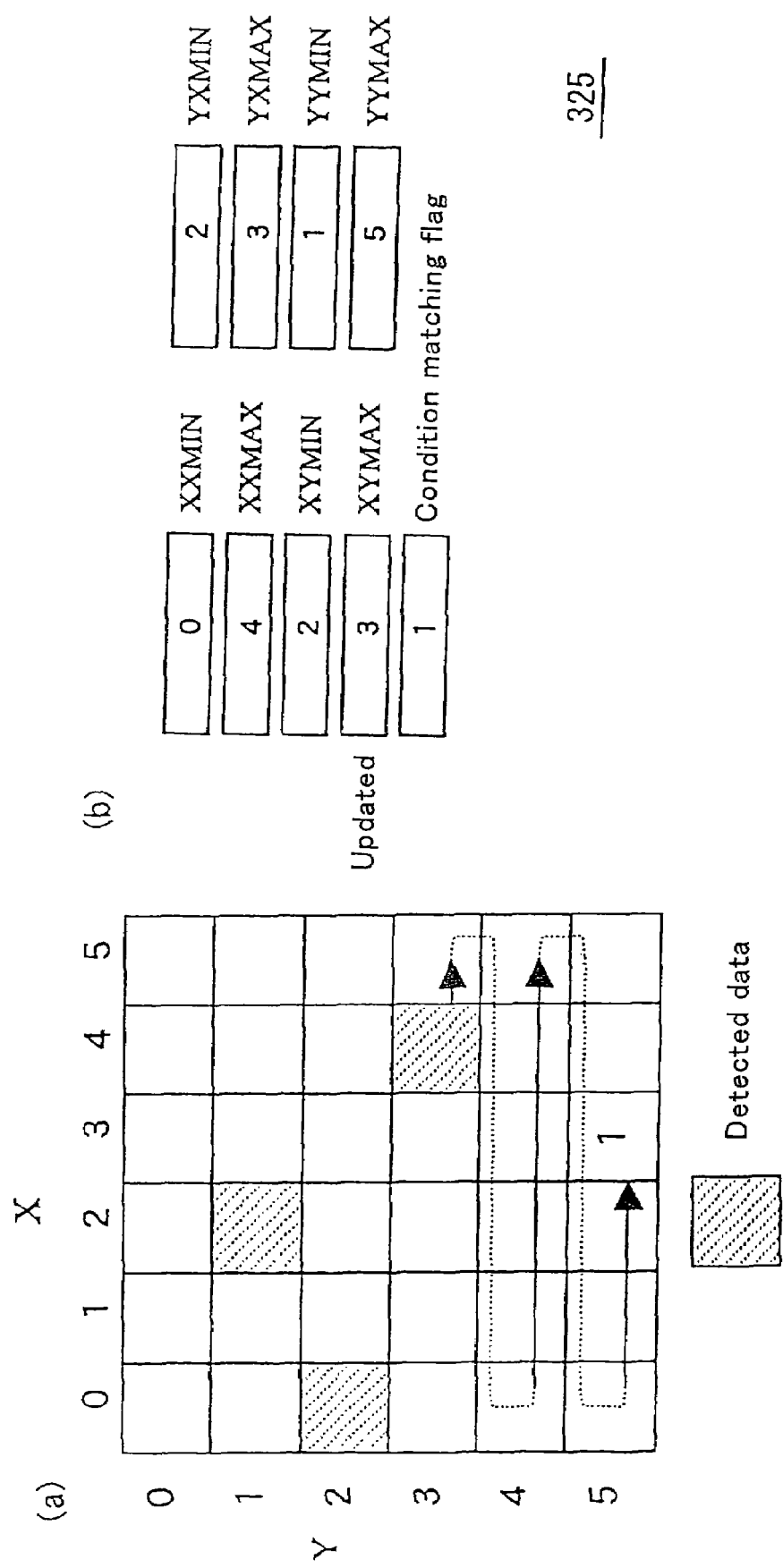
FIG. 10E is a diagram showing an exemplary manner of scanning image data according to an embodiment of this invention and a data state (E) of an object information storing register of the embodiment.

Similarly, in FIG. 10E, data satisfying the object extraction condition is detected at coordinates (3, 5) and the following data is updated to the coordinates (3, 5):

Coordinates having maximum Y: (XYMAX, YYMAX).

In this manner, every time data satisfying the extraction condition is detected, data is updated in the object information storing register 324. As a result, the following information of the object is stored:

Condition matching flag: 1
Coordinates having minimum X: (0, 2),
Coordinates having maximum X: (4, 3),
Coordinates having minimum Y: (2, 1), and.
Coordinates having maximum Y: (3, 5).

The coordinates satisfying the conditions are located at the coordinate locations indicated by the coordinate data. If other objects are detected, a number of sets of coordinate data, which is the same as the number of the other objects, are stored in the object information storing register 324.

The object information storing register 324 initializes the coordinate data before the next frame of image data is output from the camera module 2 to the object extraction LSI 3. Object information extraction is repeated from the start. Therefore, the object information stored in the object information storing register 324 is read out by the CPU 41 of the one-chip microcomputer 4 before the initialization of the object information storing register 324.

The CPU 41 of the one-chip microcomputer 4 detects the presence/absence of an object contained in an image, movement or change thereof, or the like, using object information extracted by the object information extraction LSI 3. Thus, the image processing system is controlled. Only one frame of data can be used to recognize the size and location of an object satisfying certain conditions (hue, saturation, and lightness). By comparing the coordinate data of an object between frames, movement or change of the object can be detected.

Hereinafter, a method for detecting movement or change of an object using the information (coordinate data) of an extracted object will be described in detail.

As described above, in the image processing system 1 of this embodiment, the object information storing register 324 stores information about an object contained in an image, i.e., object extraction conditions, coordinates having maximum X, coordinates having minimum X, coordinates having maximum Y, and coordinates having minimum Y.

This object information is read from the object information storing register 324 into a memory (e.g., RAM (not shown)) or a register of the one-chip microcomputer 4 for each frame. By comparing this object information with another frame of data, movement or change of an object can be detected. The information amount of an extracted object is significantly smaller than preprocessed image data. Therefore, the capacity of a memory or resistor required for storing data and the processing load of the CPU 41 can be significantly reduced.

For example, it is assumed that images having a screen size of 352 pixels×288 pixels are processed. If a screen (frame) of image data is conventionally stored, the following amount of data needs to be handled:

$YUV$(8 bits for each)×352×288=51904512 bits.

In contrast, if only the results of object extraction are stored in this embodiment, the amount of data to be handled is:

(the number of color conditions+(the number of bits for representing coordinate X+the number of bits for representing coordinate Y)×the number of coordinate points)×the number of objects.

For example, it is assumed that up to 10 objects are detected under four color conditions and the screen size is 352 pixels×288 pixels. In this case, one coordinate is represented by:

9 bits(coordinate $X$)+9 bits(coordinate $Y$)=18 bits.

In this embodiment, four coordinate points (coordinates having minimum X, coordinates having maximum X, coordinates having minimum Y, and coordinates having maximum Y) are stored for one object, the amount of the coordinate data is:

(9 bits(coordinate $X$)+9 bits(coordinate $Y$))×4 coordinate points)=72 bits.

Here, the number of color conditions corresponds to 4 bits. Therefore, one object requires:

(4 bits(the number of color conditions)+(9 bits(coordinate $X$)+9 bits(coordinate $Y$))×4 coordinate points)=76 bits.

Further, the number of objects to be recognized is assumed to be 10. The total data size is:

(4 bits(the number of color conditions)+(9 bits (coordinate $X$)+9 bits (coordinate $Y$))×4 coordinate points)×10=760 bits.

Therefore, if it is assumed that up to 10 objects are detected under four color conditions at a time, the total data size is in this embodiment:

(4+(9+9)×4)×10=760 bits.

Therefore, according to the image processing system 1 of this embodiment, the data amount per screen can be reduced as compared to the above-described conventional data amount by:

760/51904512.congruent.0.0000146=0.00146%.

The difference is increased with an increase in screen size.

For example, in the case of a screen size of 640 pixels× 480 pixels, the data amount per screen is compared with the conventional data amount as follows:

(4+(10+9)×4)×10)/(8×8×8×640×480)=800/1– 57286400.congruent.0.000005=0.0005%.

Thus, according to the image processing system 1 of this embodiment, the capacity of a memory or register for storing information about an extracted object can be significantly reduced.

According to the image processing system 1 of the present invention, object extraction information for each frame, which has been read out from the object information storing register 324 of the object information extraction circuit 32 and stored in a register or memory of the one-chip microcomputer 4, can be used to compare the location (coordinates) and size of an object under certain conditions (hue, saturation, lightness) between frames. Thereby, movement of an object can be recognized.

FIGS. 11 to 14 are diagrams showing an example in which the image processing system 1 of this embodiment is used to detect movement or change of an object.

Figure 11:
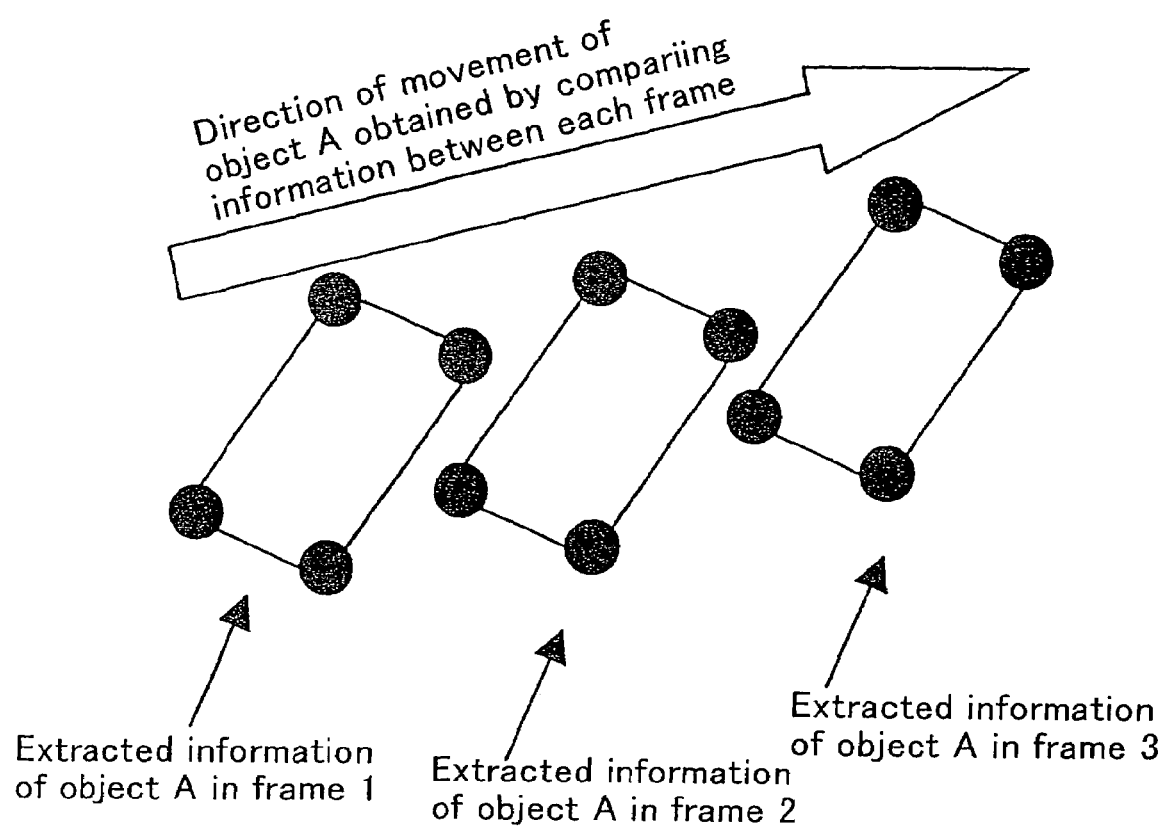
FIG. 11 is a diagram showing an example in which movement or change of an object is detected by an image processing system according to an embodiment of the present invention.

In a detection example 1 of FIG. 11, the extraction information of an object A is compared between frame 1 to frame 3, the coordinate points of the object A is changed toward a direction indicated by an arrow in FIG. 11. Thus, it is determined that the object A moves in the direction indicated by the arrow.

Figure 12:
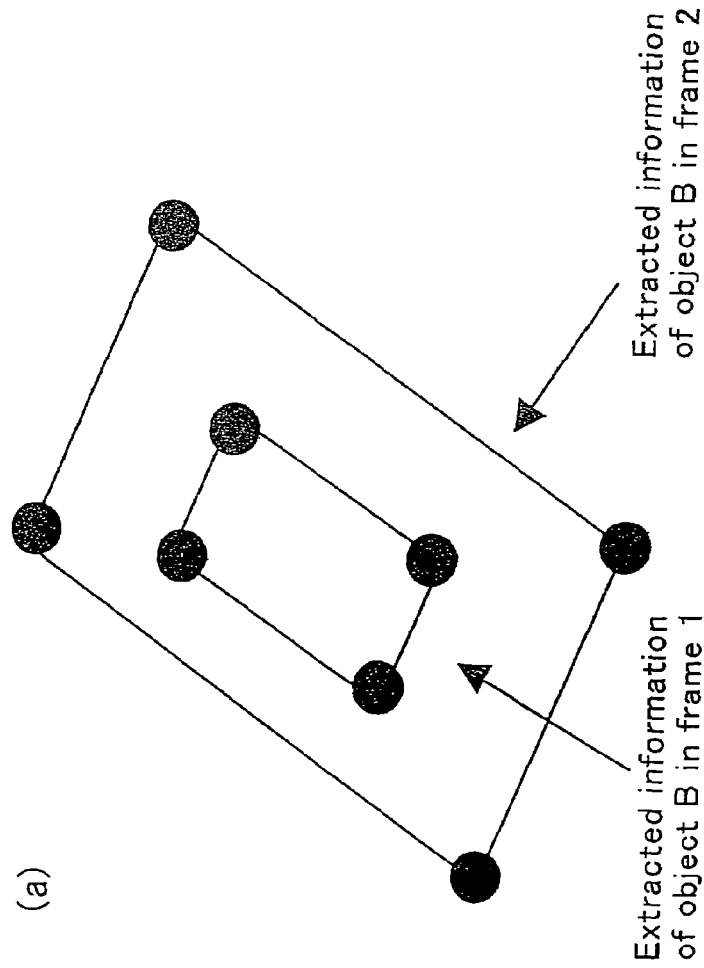
FIG. 12 is a diagram showing an example in which movement or change of an object is detected by an image processing system according to an embodiment of the present invention.
Figure 12:
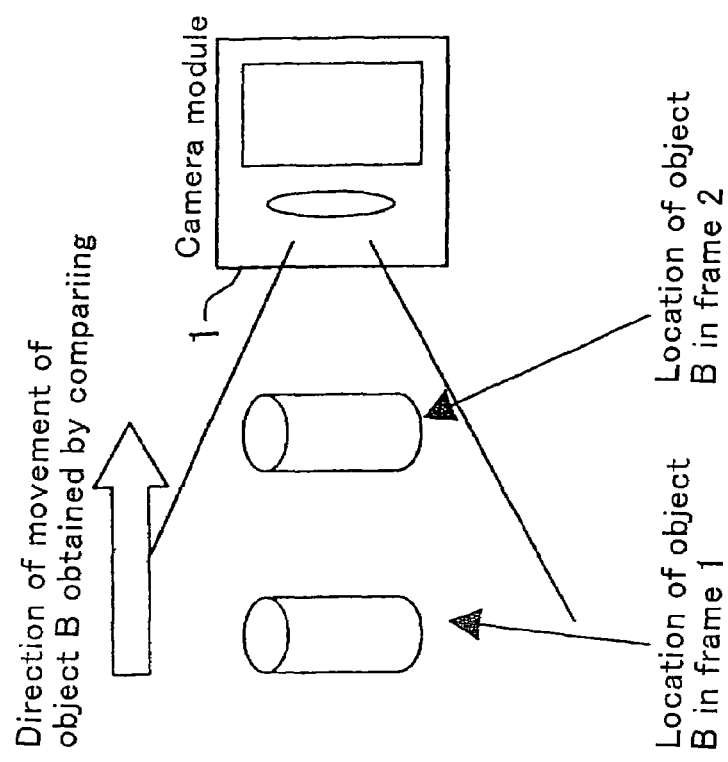

In a detection example 2 of FIG. 12, as shown in a portion (a) of FIG. 12, the extraction information of an object B is compared between a frame 1 and a frame 2. In this case, the center of the object B is not changed and the size of the object B is expanded. Therefore, as shown in a portion (b) of FIG. 12, it can be determined that the object B is looming toward a viewing site (camera module 1).

Figure 13:
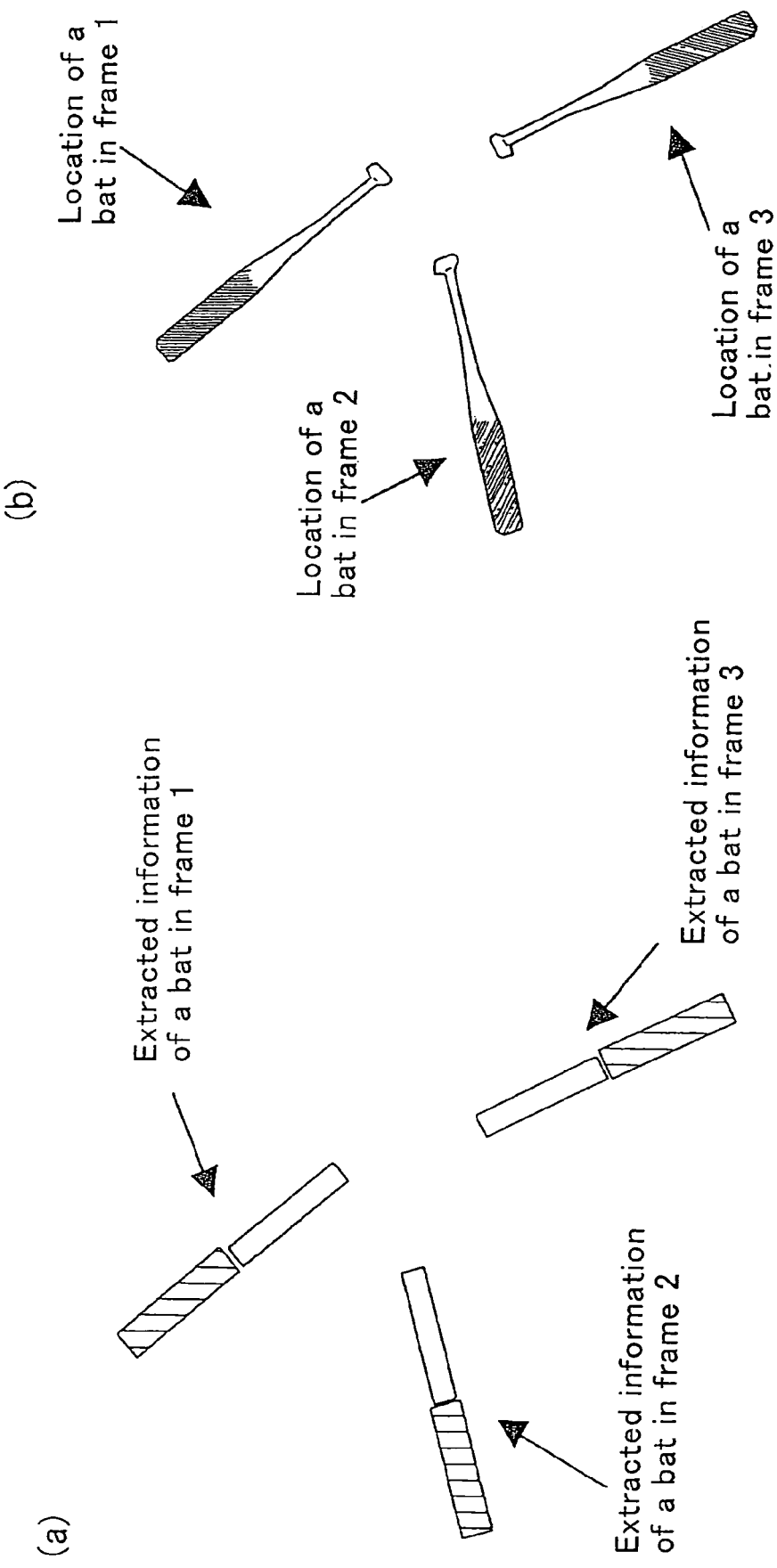
FIG. 13 is a diagram showing an example in which movement or change of an object is detected by an image processing system according to an embodiment of the present invention.

In a detection example 3 of FIG. 13, a portion (a) of FIG. 13 shows a cylindrical object like a bat having an upper portion and a lower portion which are painted with different colors. In this case, the orientation of the cylindrical object can be determined by viewing the two colors. It is assumed that the cylindrical object is a bat. The object information (coordinate data) of the bat is compared between a frame 1 to a frame 3. As shown in a portion (b) of FIG. 13, by detecting changes in the orientation and location of the bat, it can be determined whether or not the bat is swung, what trajectory is drawn by the bat, how fast the bat is moved, what timing the bat is swung, or the like. Alternatively, in the case of a table tennis racket, if the front and back sides of a plate-like object are painted with different colors, it can be determined which side of the racket is viewed, based on the color viewed.

Figure 14:
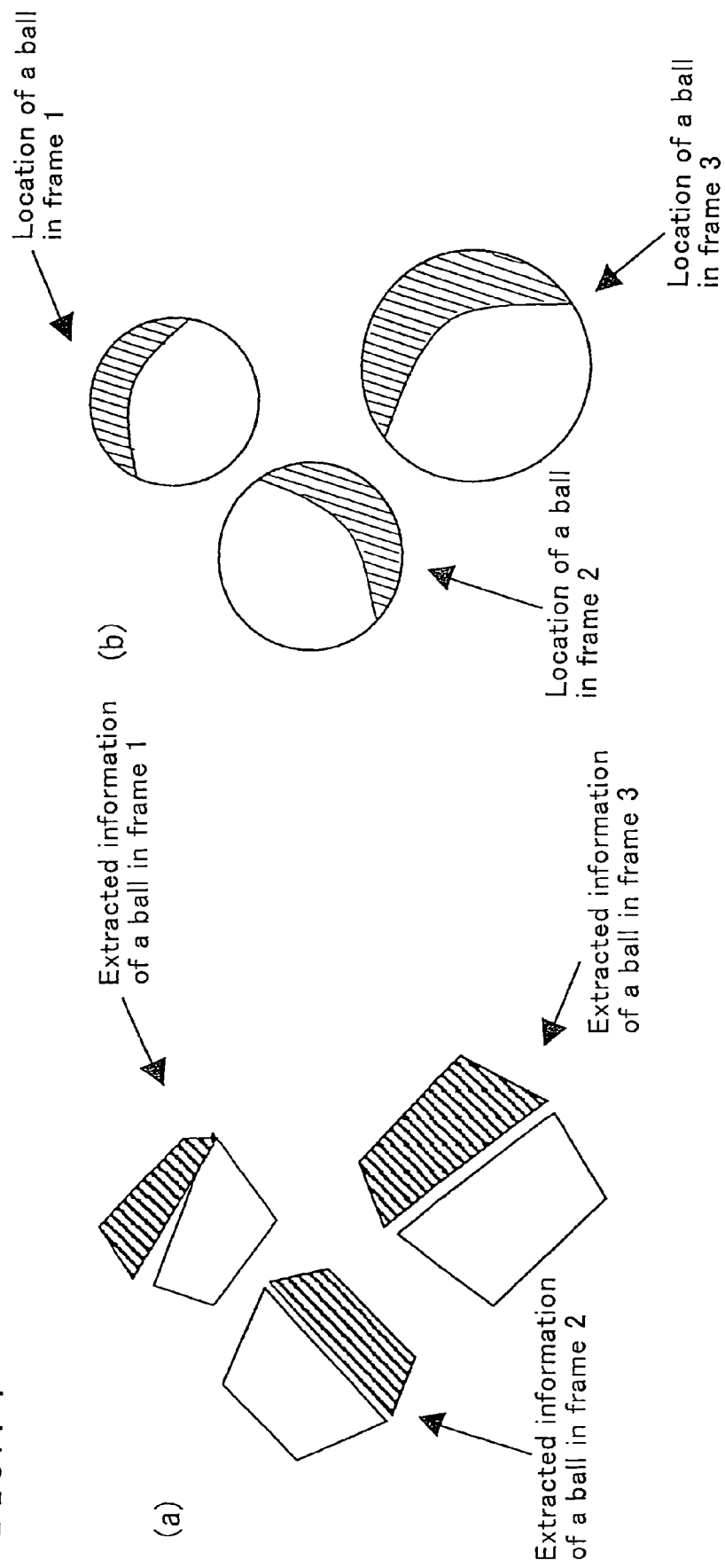
FIG. 14 is a diagram showing an example in which movement or change of an object is detected by an image processing system according to an embodiment of the present invention.

In a detection example 4 of FIG. 14, it is assumed that a ball is imaged. As shown in a portion (a) of FIG. 14, a ball-like object is painted with two colors. By comparing the extraction information of the ball-like object between a frame 1 to a frame 3, the movement, rotation or the like of the ball can be determined based on the orientation, distance and location of the ball, as shown in a portion (b) of FIG. 14.

In the above-described example, an object is painted with two colors. In addition, three, four, or more colors may be used. By adjusting the proportions of painted color areas, it is possible to obtain optimum object information. The scope of applications of the image processing system 1 can be expanded into, for example, game apparatus or the like.

In another application, by painting a cube with 6 different colors, the sides of the cube can be recognized based on color conditions. Therefore, such a cube can be recognized as a die without recognizing numerical symbols according to the image processing system 1 of this embodiment.

As described above, according to the image processing system 1 of this embodiment, an object in an image can be recognized. Therefore, the present invention can be applied to various input information as compared to input devices, such as a key board, a joystick, and the like. By painting an object to be extracted, such as a bat, a racket, a ball, a glove, or the like, with a particular color, various object information can be extracted by the object information extraction circuit 32. Therefore, games having many changes can be achieved by adjusting an image processing program read into the one-chip microcomputer 4 and color information (e.g., information indicating hue, information indicating saturation, and information indicating lightness) of an object to be extracted, without changing the hardware configuration of the image processing system 1.

Although certain preferred embodiments have been described herein, it is not intended that such embodiments be construed as limitations on the scope of the invention except as set forth in the appended claims. Various other modifications and equivalents will be apparent to and can be readily made by those skilled in the art, after reading the description herein, without departing from the scope and spirit of this invention. All patents, published patent applications and publications cited herein are incorporated by reference as if set forth fully herein.

As described above, according to the present invention, image data from an image data output section (e.g., a camera module, etc.) is serially processed by an object information processing apparatus on a pixel-by-pixel basis. Therefore, a large-capacity memory for storing image data is not required, as is different from conventional techniques. Thus, complicated calculation and processing flows are not required for object extraction. As a result, image processing can be performed in real time without using a clock signal faster than an image transfer clock signal and the load of image processing on a CPU can be minimized.

According to the present invention, an image memory or a high-performance CPU for recognizing an object in an image, which are conventionally required, are not necessary. A relatively low-performance, inexpensive CPU, processing operation circuit or the like can be used. Therefore, it is possible to significantly reduce the size and cost of an image processing system having a function of recognizing an object, a function of detecting movement or change of an object. Thereby, it is possible to achieve an image processing system capable of recognizing an object in an image and detecting movement or change of an object, which can be incorporated into toys, game apparatuses or the like for which low price is required.

Various other modifications will be apparent to and can be readily made by those skilled in the art without departing from the scope and spirit of this invention. Accordingly, it is not intended that the scope of the claims appended forth herein, but rather that the claims be

What is claimed is:

1. An object information processing apparatus for obtaining object information from input image data comprising pixels, comprising:

an object determination section for determining whether or not each pixel is a part of an object to be extracted by comparing color information indicating a color of the pixel with a predetermined reference value for the object;

an object information retaining section for retaining coordinate data of the pixel as the object information if the pixel has been determined by the object determination section to be a part of the object to be extracted; and a noise removal section for removing noise from a result of determination by the object determination section, wherein the noise removal section comprises, a shift register section for successively retaining the result of determination by the object determination section, the shift register section including a plurality of shift register units corresponding to a number of determination operations of the object determination section, and a noise removal determination section for determining whether or not a predetermined number or more of a plurality of results of the shift register section are equal to one another to determine whether or not the plurality of results are noise, and wherein the predetermined number or more of the plurality of results of the shift register section represents a majority of shift register units of the shift register section, and if the majority of shift register units have the same result for the pixel, the pixel is determined to be part of an object to be extracted, but not noise.

2. An object information processing apparatus according to claim 1, wherein the object determination section comprises:

a first to an $n^{th}$ comparison sections for determining whether or not the color information of each pixel of the input image satisfies a first to an $n^{th}$ object conditions, respectively (n: natural integer); and an AND circuit for receiving n outputs of the first to the $n^{th}$ comparison sections.

3. An object information processing apparatus according to claim 1, further comprising:

an image data conversion section provided before the object determination section, for converting an UYVY value of the input image data to an HSV value, wherein the object determination section compares the HSV value of each pixel output by the image data conversion section with the predetermined reference value to determine whether or not the pixel is a part of the object to be extracted.

4. An object information processing apparatus according to claim 3, wherein the image data conversion section has a first conversion table for converting an UV value of the input image data to an H (hue) value, and a second conversion table for converting the UV value of the input image data to an S (saturation) value, and the image data conversion section outputs a Y value of the input image as a V (lightness) value.

5. An object information processing apparatus according to claim 1, further comprising:

an object inclusion relation determination section for determining whether a pixel of the input image data which has been determined by the object determination section to be a part of an object to be extracted is a part of an already detected object or of a new object which has not been detected, and generating coordinate data of the pixel, wherein the object information retaining section retains the coordinate data generated by the object inclusion relation determination section for each detected object.

6. An object information processing apparatus according to claim 5, wherein the object inclusion relation determination section generates four coordinate points: coordinates having maximum X, coordinates having minimum X, coordinates having maximum Y, and coordinates having minimum Y, where coordinates of the object are (X, Y).

7. An object information processing apparatus according to claim 6, wherein when a pixel of the input image data appears which has been determined by the object determination section to be a part of an object to be extracted, the object inclusion relation determination section determines whether or not there is another pixel satisfying the same object condition, and when there is another pixel satisfying the same object condition, the other pixel is determined to be a part of the object and the coordinate data (X, Y) of the object is updated.

8. An object information processing apparatus according to claim 7, wherein when a pixel of the input image data appears which has been determined by the object determination section to be a part of an object to be extracted and the object inclusion relation determination section determines that there is no pixel satisfying the same object condition, the pixel is determined to be a part of a newly detected object and information about the pixel is stored in the object information retaining section corresponding to the newly detected object.

9. An object information processing apparatus according to claim 1, wherein when a plurality of object extraction conditions are provided, the object information retaining section retains a condition matching flag indicating which object condition is satisfied as a part of the object information.

10. An object information processing apparatus according to claim 1, wherein the object information retaining section retains one frame of object information of an object which has been determined to be an object to be extracted.

11. An image processing system, comprising:
an object information processing apparatus for obtaining object information from input image data comprising pixels, comprising:
an object determination section for determining whether or not each pixel is a part of an object to be extracted by comparing color information indicating a color of the pixel with a predetermined reference value for the object;
an object information retaining section for retaining coordinate data of the pixel as the object information if the pixel has been determined by the object determination section to be a part of the object to be extracted;
a noise removal section for removing noise from a result of determination by the object determination section,
wherein the noise removal section comprises,
a shift register section for successively retaining the result of determination by the object determination section, the shift register section including a plurality of shift register units corresponding to a number of determination operations of the object determination section, and
a noise removal determination section for determining whether or not a predetermined number or more of a plurality of results of the shift register section are equal to one another to determine whether or not the plurality of results are noise, and wherein
the predetermined number or more of the plurality of results of the shift register section represents a majority of shift register units of the shift register section, and
if the majority of shift register units have the same result for the pixel, the pixel is determined to be part of an object to be extracted, but not noise;
an image data output apparatus for outputting image data into the object information processing apparatus; and
a control apparatus for controlling the object information processing apparatus and the image data output apparatus.

12. An image processing system according to claim 11, wherein the image data output apparatus is provided with an image pickup device for taking an object image, and coordinate data of the object indicating a location of the object is coordinate data on the image pickup device.

13. An image processing system according to claim 11, wherein the control apparatus comprises a processing operation section for reading out object information stored in the object information processing apparatus and performing a processing operation for recognizing an object contained in image data.

14. An image processing system according to claim 13, wherein the processing operation section reads out the object information from the object information processing apparatus on a frame-by-frame basis.

15. An image processing system according to claim 14, wherein the processing operation section reads out the object information, which has been extracted on a frame-by-frame basis, from the object information processing apparatus and compares the object information between frames to detect movement or change of an object.

16. An image processing system according to claim 15, wherein the control apparatus recognizes that the object is moving in a predetermined direction when coordinate data of the object is changed in the predetermined direction between each of a plurality of consecutive frames.

17. An image processing system according to claim 15, wherein the control apparatus recognizes that the object is looming toward a viewing site when a coordinate location of the object is not changed and a size of the object is expanding between each of a plurality of consecutive frames in coordinate data of the object.

18. An image processing system according to claim 15, wherein the control apparatus recognizes that the object is moving away from a viewing site when a coordinate location of the object is not changed and a size of the object is shrinking between each of a plurality of consecutive frames in coordinate data of the object.

19. An image processing system according to claim 15, wherein when the object has at least two colors, the control apparatus recognizes a behavior of the object when each color of the object is moved between each of a plurality of consecutive frames.

20. A game apparatus, which recognizes a behavior of an object using an image processing system, wherein the image processing system comprises:
an object information processing apparatus for obtaining object information from input image data comprising pixels, comprising:
an object determination section for determining whether or not each pixel is a part of an object to be extracted by comparing color information indicating a color of the pixel with a predetermined reference value for the object;

an object information retaining section for retaining coordinate data of the pixel as the object information if the pixel has been determined by the object determination section to be a part of the object to be extracted;

a noise removal section for removing noise from a result of determination by the object determination section, wherein the noise removal section comprises, a shift register section for successively retaining the result of determination by the object determination section, the shift register section including a plurality of shift register units corresponding to a number of determination operations of the object determination section, and a noise removal determination section for determining whether or not a predetermined number or more of a plurality of results of the shift register section are equal to one another to determine whether or not the plurality of results are noise, and wherein the predetermined number or more of the plurality of results of the shift register section represents a majority of shift register units of the shift register section, and if the majority of shift resister units have the same result for the pixel, the pixel is determined to be part of an object to be extracted, but not noise;

an image data output apparatus for outputting image data into the object information processing apparatus; and a control apparatus for controlling the object information processing apparatus and the image data output apparatus, and for recognizing a behavior of the object based on the obtained object information.

21. An image processing method, comprising the steps of:

outputting image data from an image data output apparatus to an object information processing apparatus;

converting a UYVY value of the input image data to an HSV value using the object information processing apparatus, comparing the HSV value of each pixel with a reference value provided for an object to be extracted to determine whether or not the pixel is a part of the object to be extracted, storing coordinate data of the pixel which has been determined to be a part of the object to be extracted as object information on an object-by-object basis, and successively retaining in a shift register the result of determination of whether the pixel is a part of the object to be extracted, the shift register comprising a plurality of shift register units corresponding to a number of determination operations; and reading the object information stored in the object information processing apparatus using a processing operation section of a control apparatus on a frame-by-frame basis and recognizing an object contained in image data based on the object information, wherein if a majority of the shift register units have the same result for the pixel, the pixel is determined to be part of an object to be extracted, but not noise wherein the processing operation section of the control apparatus reads out the object information, which has been extracted on a frame-by-frame basis, from the object information processing apparatus and compares the object information between each frame to detect movement or change of an object.

* * * * *